United States Patent
Russell, Jr. et al.

(10) Patent No.: US 11,706,598 B2
(45) Date of Patent: Jul. 18, 2023

(54) INTERFACE OF AN M2M SERVER WITH THE 3GPP CORE NETWORK

(71) Applicant: DRNC HOLDINGS, INC., Wilmington, DE (US)

(72) Inventors: Paul L. Russell, Jr., Pennington, NJ (US); Ashish Gupta, Sunnyvale, CA (US); Nicholas J. Podias, Brooklyn, NY (US); Ana Lucia A. Pinheiro, Beaverton, OR (US); Jean-Louis Gauvreau, La Prairie (CA); Rocco Di Girolamo, Laval (CA); Guang Lu, Thornhill (CA); Debjani Majumder, Bangalore (IN)

(73) Assignee: DRNC HOLDINGS, INC., Wilmington, DE (US)

( * ) Notice: Subject to any disclaimer, the term of this patent is extended or adjusted under 35 U.S.C. 154(b) by 36 days.

(21) Appl. No.: 17/184,070

(22) Filed: Feb. 24, 2021

(65) Prior Publication Data

US 2021/0185499 A1    Jun. 17, 2021

Related U.S. Application Data

(63) Continuation of application No. 15/643,411, filed on Jul. 6, 2017, now abandoned, which is a continuation
(Continued)

(51) Int. Cl.
*H04W 4/70*      (2018.01)
*H04W 8/20*      (2009.01)
(Continued)

(52) U.S. Cl.
CPC .......... *H04W 4/70* (2018.02); *H04L 65/1063* (2013.01); *H04W 8/20* (2013.01); *H04W 12/06* (2013.01); *H04W 76/12* (2018.02)

(58) Field of Classification Search
CPC ......... H04W 4/70; H04W 8/20; H04W 12/06; H04W 76/12; H04L 65/1063
See application file for complete search history.

(56) References Cited

U.S. PATENT DOCUMENTS

2010/0177663 A1* 7/2010 Johansson ............. H04W 76/10
                                                370/254
2010/0272020 A1 10/2010 Norp et al.
(Continued)

FOREIGN PATENT DOCUMENTS

WO    WO-2008151663 A1 * 12/2008 ......... H04L 63/0869

OTHER PUBLICATIONS

3rd Generation Partnership Project (3GPP), S2-100087, "Architecture for Service Control Optimization", ZTE, 3GPP TSG SA WG2 Meeting #77, Shenzhen, China, Jan. 18-22, 2010, 6 pages.
(Continued)

*Primary Examiner* — Pao Sinkantarakorn
*Assistant Examiner* — Kabir U Jahangir
(74) *Attorney, Agent, or Firm* — Volpe Koenig

(57) ABSTRACT

A network node is configured to initiate a first authentication and key establishment procedure with a machine to machine (M2M) device. The network node is configured to determine a key agreement between the network node and the M2M device using the first authentication and key establishment procedure. The network node is configured to initiate a second authentication and key establishment procedure with an M2M server. The network node is configured to receive a request from the M2M server for the key agreement to be used to communicate with the M2M device using the second authentication and key establishment procedure. The network node is configured to send the key agreement to the M2M server using the second authentication and key establishment procedure.

10 Claims, 15 Drawing Sheets

Related U.S. Application Data of application No. 13/806,450, filed as application No. PCT/US2011/041767 on Jun. 24, 2011, now Pat. No. 9,736,873.

(60) Provisional application No. 61/358,688, filed on Jun. 25, 2010.

(51) Int. Cl.
*H04L 65/1063* (2022.01)
*H04W 76/12* (2018.01)
*H04W 12/06* (2021.01)

(56) References Cited

U.S. PATENT DOCUMENTS

| | | | |
|---|---|---|---|
| 2011/0280184 A1* | 11/2011 | Diachina | H04W 76/12 370/328 |
| 2012/0047551 A1* | 2/2012 | Pattar | H04W 4/70 726/1 |
| 2012/0185576 A1* | 7/2012 | Qu | H04W 4/08 709/223 |
| 2014/0220951 A1 | 8/2014 | Gumbrell et al. | |

OTHER PUBLICATIONS

3rd Generation Partnership Project (3GPP), TR 22.868 V8.0.0, "Technical Specification Group Services and System Aspects; Study on Facilitating Machine to Machine Communication in 3GPP Systems (Release 8)", Mar. 2007, 15 pages.

3rd Generation Partnership Project (3GPP), TR 23.888 V0.4.1, "Technical Specification Group Services and System Aspects, System Improvements for Machine-Type Communications (Release 10)", Jun. 2010, 53 pages.

3rd Generation Partnership Project (3GPP), TS 24.008 V9.3.0, "Technical Specification Group Core Network and Terminals, Mobile Radio Interface Layer 3 Specification; Core Network Protocols, Stage 3 (Release 9)", Jun. 2010, 611 pages.

ETSI, "Machine-to-Machine communications (M2M); Functional architecture," Draft ETSI TS 102 690 V<0.5.1> (Feb. 2010).

Third Generation Partnership Project, "Technical Specification Group Services and System Aspects; 3G Security; Security architecture (Release 9)," 3GPP TS 33.102 V9.2.0 (Mar. 2010).

Third Generation Partnership Project, "Technical Specification Group Services and System Aspects; 3G Security; Security architecture (Release 9)," 3GPP TS 33.102 V9.4.0 (Dec. 2010).

Third Generation Partnership Project, "Technical Specification Group Services and System Aspects; 3G Security; Security architecture (Release 10)," 3GPP TS 33.102 V10.0.0 (Dec. 2010).

Third Generation Partnership Project, "Technical Specification Group Services and System Aspects; General Packet Radio Service (GPRS); Service description; Stage 2 (Release 10)," 3GPP TS 23.060 V10.0.0 (Jun. 2010).

Third Generation Partnership Project, "Technical Specification Group Services and System Aspects; General Packet Radio Service (GPRS); Service description; Stage 2 (Release 10)," 3GPP TS 23.060 V10.4.0 (Jun. 2011).

Third Generation Partnership Project, "Technical Specification Group Services and System Aspects; System Improvements for Machine-Type Communications; (Release 11)," 3GPP TR 23.888 V1.3.0 (Jun. 2011).

Third Generation Partnership Project, "Technical Specification Group Core Network and Terminals; Mobile radio interface Layer 3 specification; Core network protocols; Stage 3 (Release 9)," 3GPP TS 24.008 V9.7.0 (Jun. 2011).

Third Generation Partnership Project, "Technical Specification Group Core Network and Terminals; Mobile radio interface Layer 3 specification; Core network protocols; Stage 3 (Release 10)," 3GPP TS 24.008 V10.3.0 (Jun. 2011).

Third Generation Partnership Project, "Technical Specification Group Core Network and Terminals; Technical realization of the Short Message Service (SMS) (Release 9)," 3GPP TS 23.040 V9.2.0 (Mar. 2010).

Third Generation Partnership Project, "Technical Specification Group Core Network and Terminals; Technical realization of the Short Message Service (SMS) (Release 9)," 3GPP TS 23.040 V9.3.0 (Sep. 2010).

Third Generation Partnership Project, "Technical Specification Group Core Network and Terminals; Technical realization of the Short Message Service (SMS) (Release 10)," 3GPP TS 23.040 V10.0.0 (Mar. 2011).

* cited by examiner

INTERFACE OF AN M2M SERVER WITH THE 3GPP CORE NETWORK

CROSS REFERENCE TO RELATED APPLICATIONS

This application is a continuation of U.S. patent application Ser. No. 15/643,411 filed Jul. 6, 2017, which was a continuation of U.S. patent application Ser. No. 13/806,450 filed Jun. 11, 2013, which issued on Aug. 15, 2017 as U.S. Pat. No. 9,736,873, which is a continuation of the National Stage entry under 35 U.S.C. § 371 of Patent Cooperation Treaty Application No. PCT/US2011/041767, filed Jun. 24, 2011, which claims the benefit of U.S. Provisional Patent Application No. 61/358,688, filed Jun. 25, 2010, the contents of which are hereby incorporated by reference herein.

BACKGROUND

Machine type communication (MTC), or alternately machine to machine (M2M) communication, is a form of data communication which may involve one or more devices or entities that may communicate without human interaction. Respective communication networks may include any number of MTC capable devices. Metering devices or tracking devices may be examples of MTC devices. As used herein, the term user equipment (UE), Mobile Station (MS), and Wireless Transmit/Receive Unit (WTRU) may include MTC devices.

Machine type communications may use an MTC Server, which may alternately be referred to as an M2M Server. A M2M server may collect data or control information from MTC devices. A M2M server may also send data and other information to M2M devices. MTC devices may communicate via 3GPP networks such as Long Term Evolution (LTE) networks, Universal Mobile Telecommunication System (UMTS) networks, Worldwide Interoperability for microwave Access (WiMAX) networks, and the like.

SUMMARY

A cellular network node, for example a Serving General Packet Radio Service (GPRS) Support Node (SGSN), may communicate with an M2M server. The cellular network node may receive subscriber data and control data. The control data may facilitate a network control procedure and the subscriber data may identify a device involved in the network control procedure. Example network control procedures may include network attach procedures, network detach procedures, authentication procedures, security mode procedures, Packet Data Protocol (PDP) context procedures, location area update procedures, routing area update procedures, tracking area update procedures, or the like.

The cellular network node may determine that the device involved in the network control procedure is a machine to machine device based on the subscriber data. For example, the subscriber data may include an Access Point Name (APN), and the cellular network node may determine that a device is an M2M device based on the APN. The cellular network node may also send the control data to a machine to machine server using a message sent via a dedicated interface with the machine to machine server. The dedicated interface may be called a GM2M interface. The dedicated interface may be a logical interface internal to the network node.

The M2M server may request control data such as the current status of a M2M device. For example, the M2M server may request control data such as an attach status, a routing area status, security mode status, authentication status, PDP context status, and/or the like. The control data may be based on mobility control information or connection control information. The request for control data may be sent to a cellular network node via the GM2M interface. The cellular network node may initiate a network control procedure based on the request from the M2M server. The cellular network node may send control information from the network control procedure to the M2M device via the GM2M interface.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
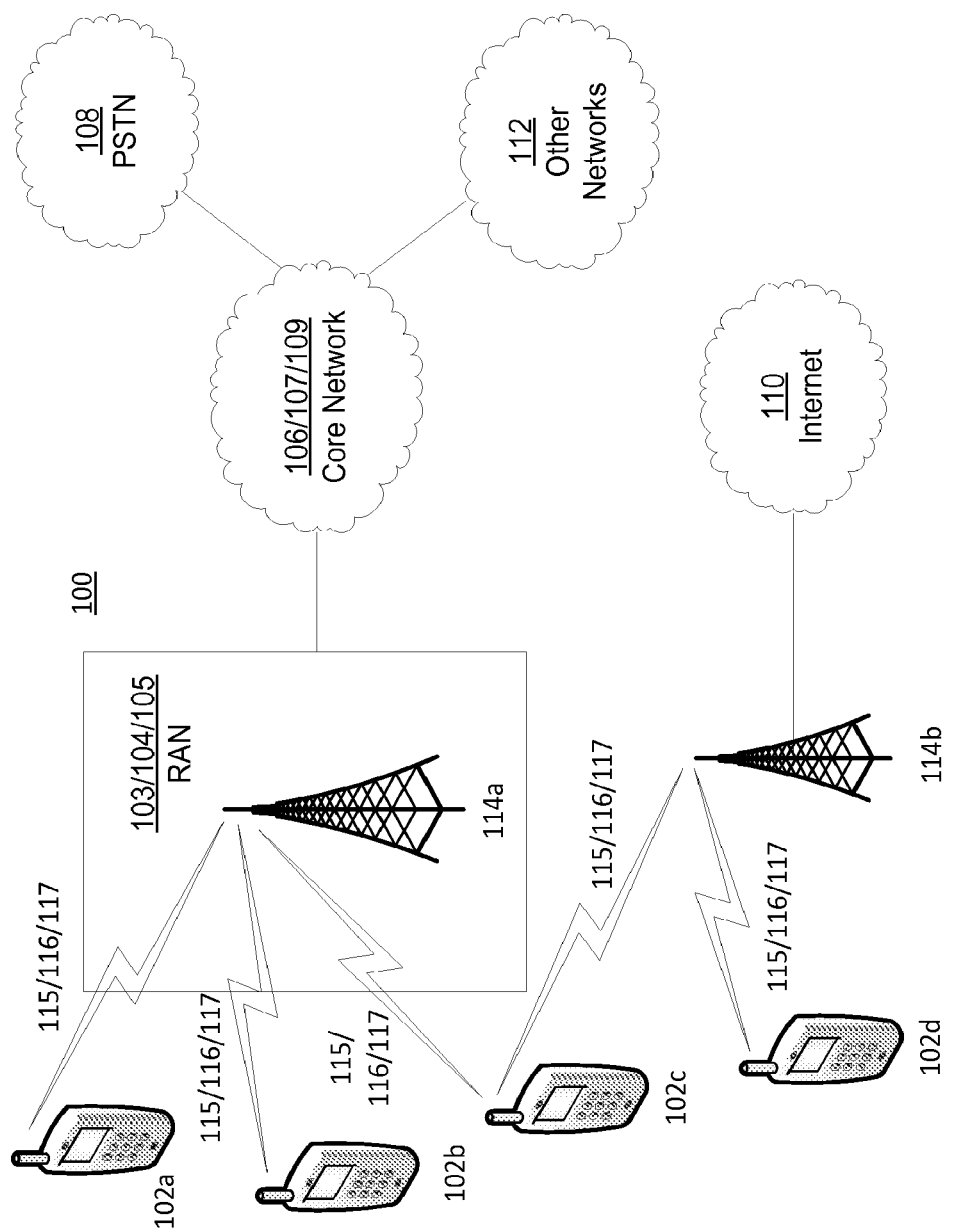
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1.times., CDMA2000 EV-DO, Interim Standard 2000 (IS-2000). Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
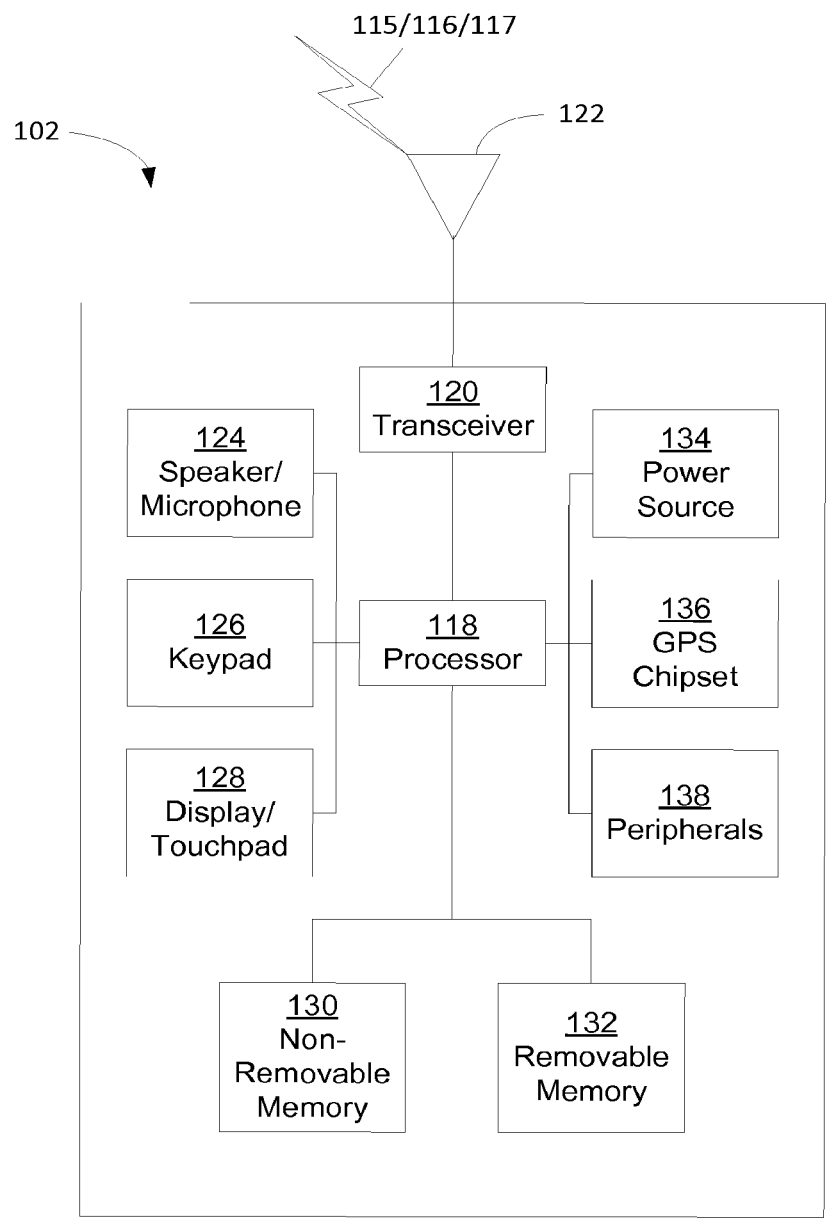
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth.RTM. module, a frequency modulated (FM) radio unit, a digital music player, a media player, a video game player module, an Internet browser, and the like.

Figure 1C:
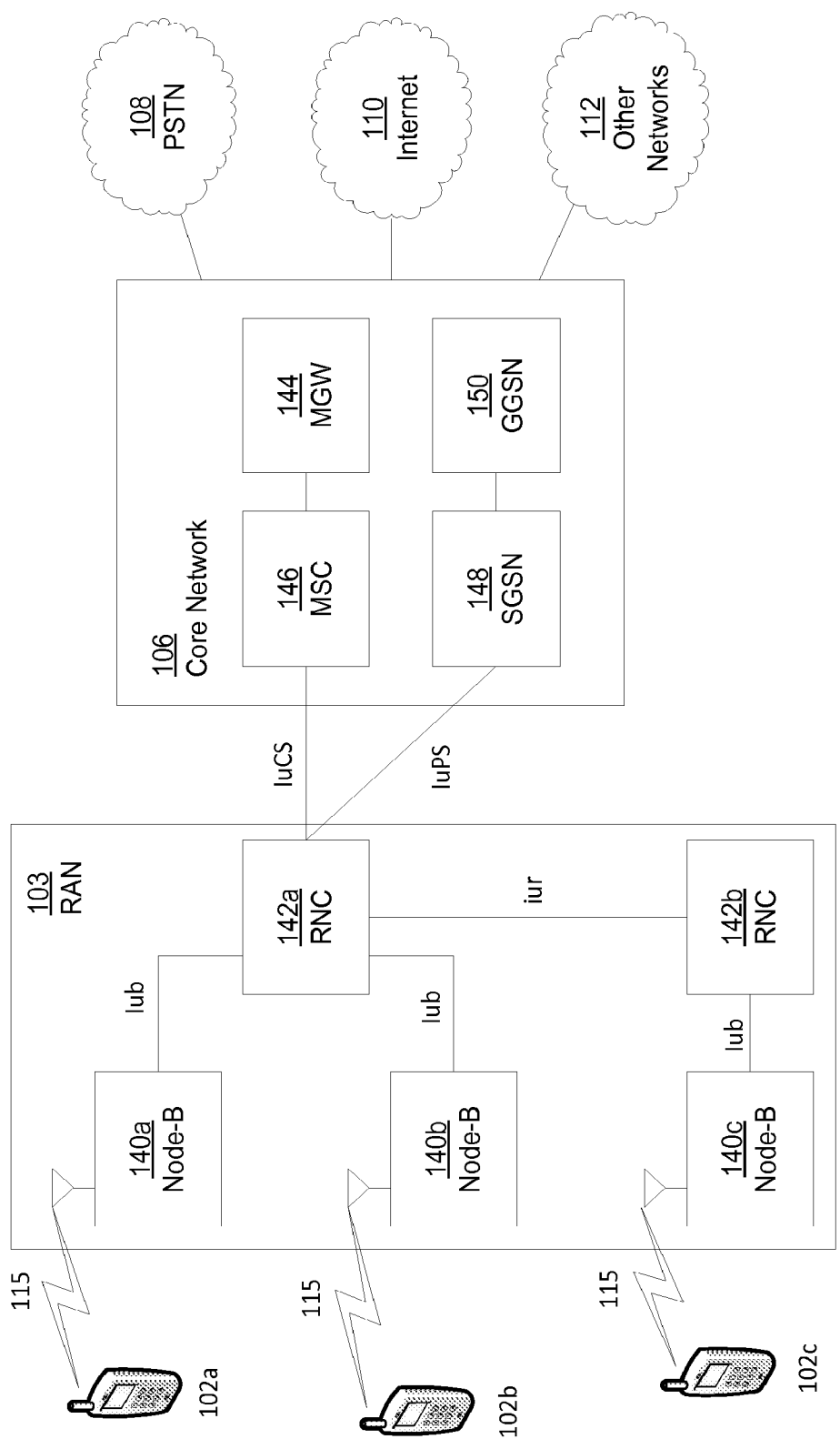
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
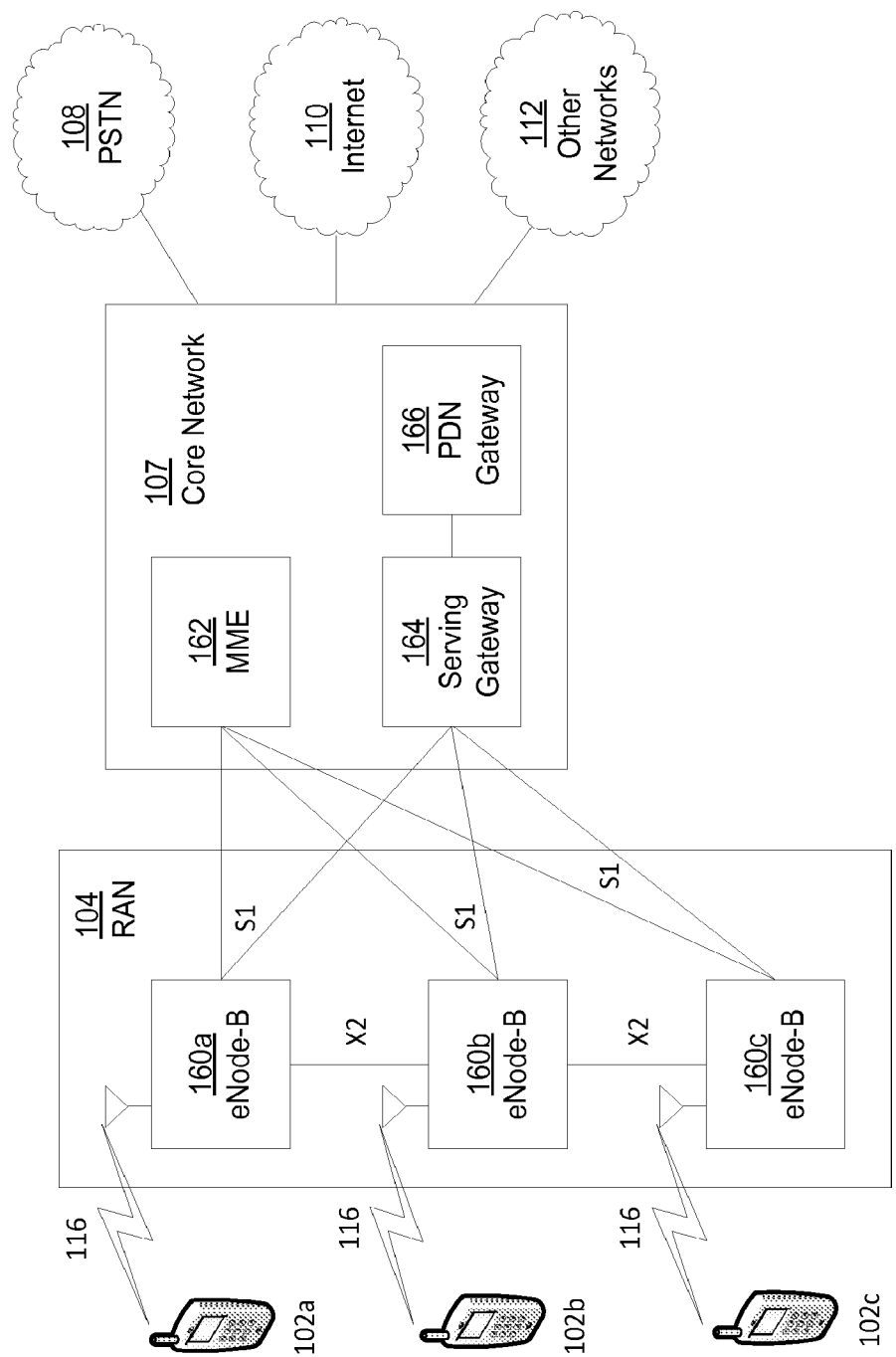
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a. 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b. 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
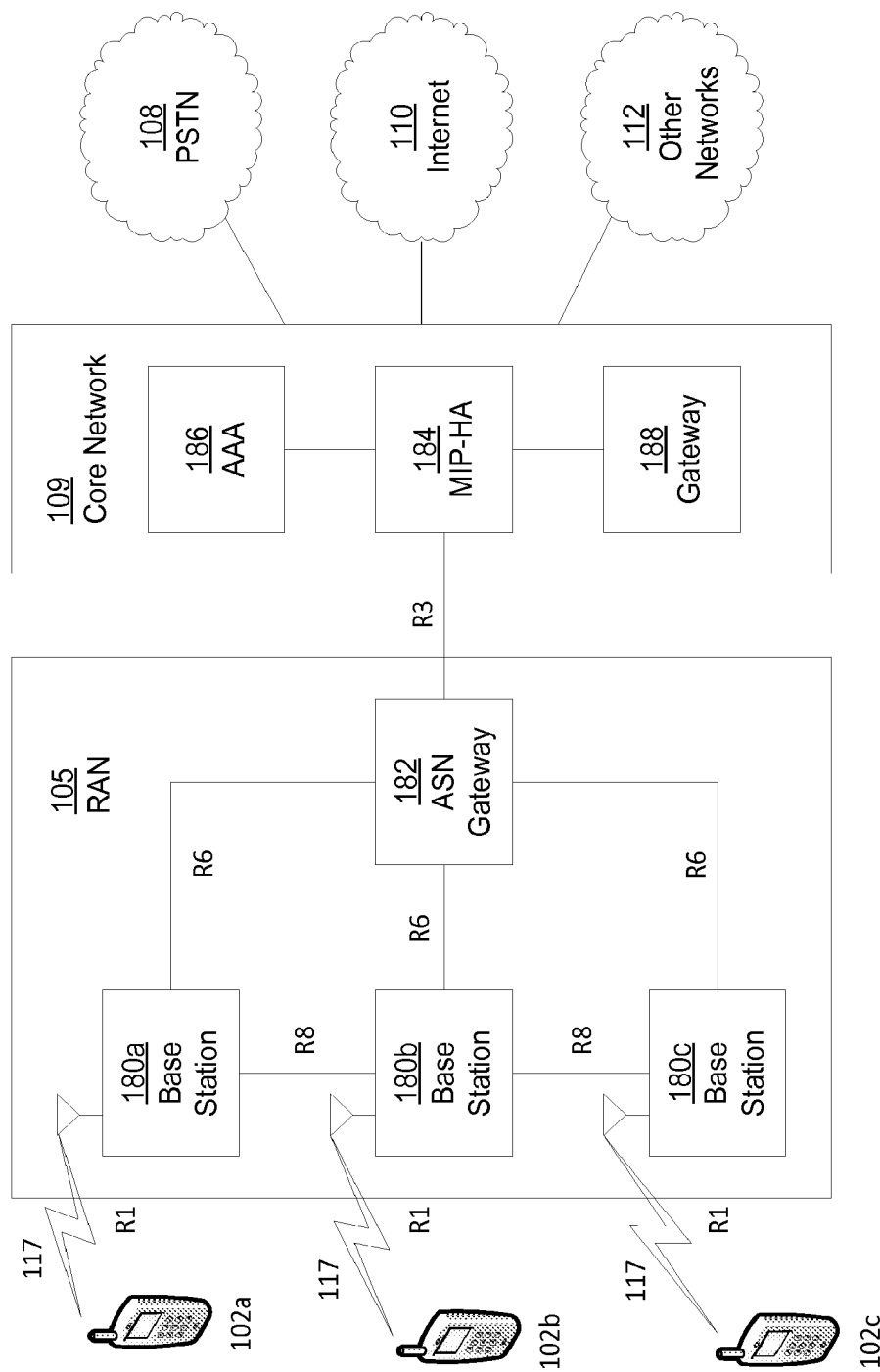
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MTP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

M2M Servers may provide M2M services for M2M devices. For example, an M2M server may send data to and receive data from an M2M device. For M2M device communicating with the M2M server via a 3GPP network (e.g., a cellular network), the M2M server may collect control information or data regarding the M2M device that is generated or maintained by the 3GPP Core Network. Example control data may include, but is not limited to, mobility information (e.g., routing area information, location area information, tracking area information, etc.), connection information (e.g., PDP context information, IP address, other addressing information, network attach/detach data, etc.), security information (e.g., authentication information, cyphering information, security mode information, etc.), or any other information maintained or generated by a 3GPP core network.

To send and receive data between a M2M server and a cellular network node of a 3GPP network, a connection may be established between an M2M server and the cellular network node. For example, the cellular network node may be a SGSN. The connection between the cellular network node and the M2M server may be a dedicated interface. The dedicated interface may be referred to herein as a GM2M interface. The GM2M interface may include a defined communications protocol stack. Control and/or data signals from an M2M device and an M2M server may be communicated via the dedicated interface.

The cellular network node may determine that a device is a machine to machine device based on subscriber data. For example, the subscriber data may include an Access Point Name (APN), and the cellular network node may determine that a device is an M2M device based on the APN. The APN may be received from another cellular network node, for example a HLR. Subscriber data may be other data which may be used to identify a machine to machine device. For example, if the cellular network node has communicated with the M2M device in the past, it may store an indication that identifies the device as an M2M device. When the cellular network node receives subscriber data for the M2M device, such as a device identification or address, the indication may be used to determine that the device is an M2M device.

The M2M server may request control data such as the current status of a M2M device. For example, the M2M server may request control data such as an attach status, a routing area status, security mode status, authentication status, PDP context status, and/or the like. The control data may be based on mobility control information or connection control information. The request for control data may be sent to a cellular network node via the GM2M interface. The cellular network node may initiate a network control procedure based on the request from the M2M server. The cellular network node may send control information from the network control procedure to the M2M device via the GM2M interface.

The systems and methods disclosed herein may be described in relation to connecting an M2M Server to the SGSN of the 3GPP Core Network. However, the systems and methods disclosed herein may be applicable to other connection implementations. As such, use of the concepts described herein may not be limited to connections relating to the SGSN of the 3GPP Core Network. For example the interface may be between the M2M server and a GGSN. In another example the dedicated interface may be between the M2M server and a MME in an LTE network.

In a 3GPP network, an SGSN may include one or more logical interfaces for communication with various network nodes and entities. Exemplary interfaces with the SGSN may include one or more of the following:

Ga-SGSN↔Charging Gateway Function (CGF)
Gb-SGSN↔Base Station Subsystem (BSS)
Gc-GGSN↔Home Location Register (HLR)
Gd-SGSN↔Short Message Service (SMS) Mobile Switching Center (MSC)
Ge-SGSN↔GSM Service Control Function (SCF)
Gf-SGSN↔Equipment Identity Register (EIR)
Gi-GGSN↔Public Data Network (PDN)
Gn-SGSN↔GGSN
Gp-GSN↔GPRS Support Node (GSN)
Gr-SGSN↔Home Location Register (HLR)
Gs-SGSN↔MSC/visitor Location register (VLR)

Figure 2:
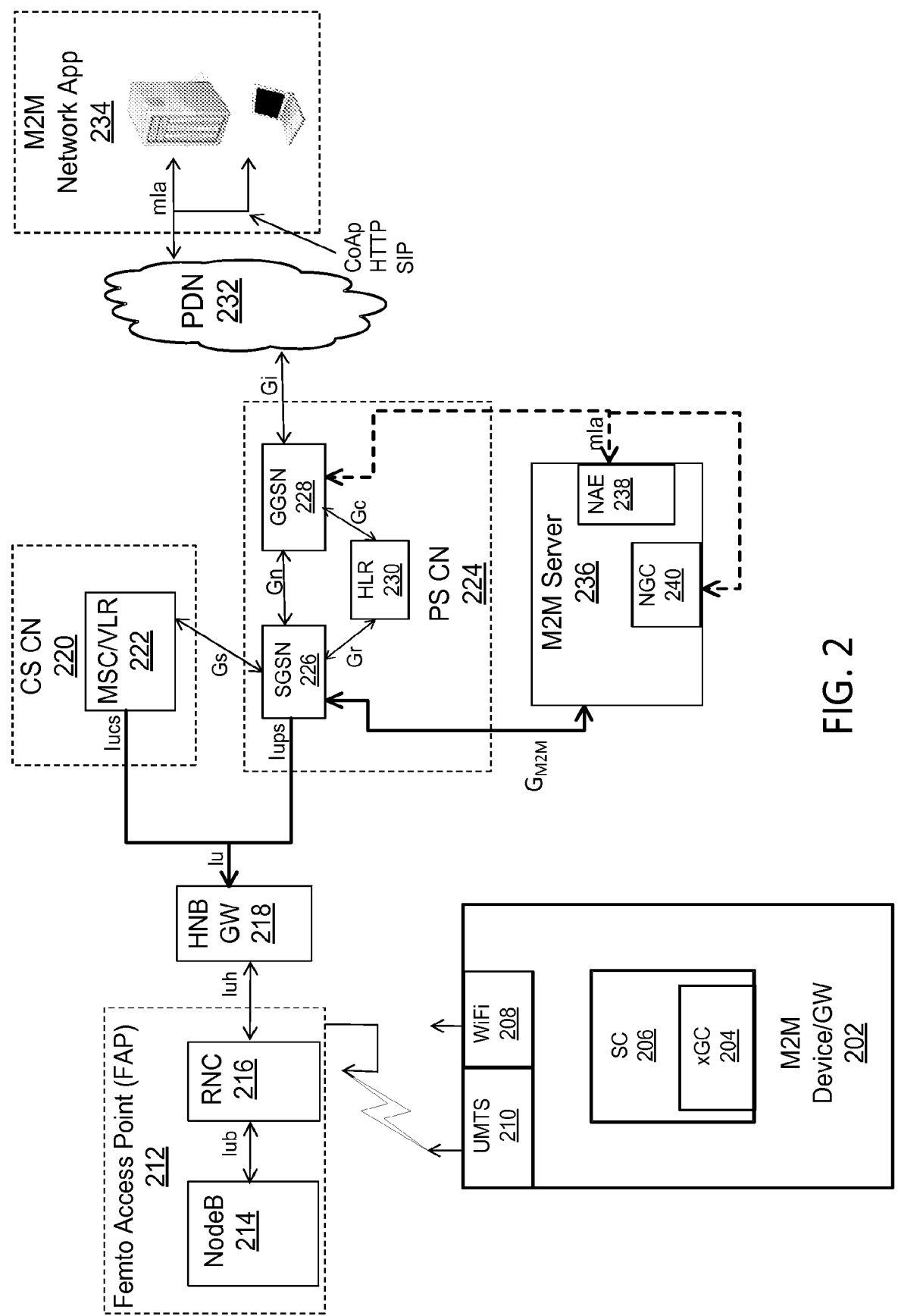
FIG. 2 illustrates an example embodiment of a 3GPP network including an integrated M2M server.

FIG. 2 illustrates an exemplary 3GPP architecture including an M2M server 236 in accordance with an embodiment. As shown in FIG. 2, M2M Server 236 (which may be referred to as A Machine Type Communication (MTC) Server) may be integrated with a 3GPP network. For example, M2M server 236 may include an interface with SGSN 226. The interface may be referred to as a GM2M interface.

FIG. 2 illustrates how various network nodes and connected devices may communicate in a 3GPP network. For example, M2M Device/GW 202 may be a WTRU capable of connecting to a 3GPP network. M2M Device/GW 202 may be a M2M device, such as a sensor reporting data. In another example, M2M Device/GW 202 may be a gateway collecting information from various M2M devices in order to relay data to the 3GPP network. M2M Device/GW 202 may include Generic Communication (xGC) interface 204 and Service Capability (SC) 206. xGC 204 may be a communications interface that allows M2M Device/GW 202 to communicate with a variety of devices, gateways, and/or networks using different communications protocols. SC 206 may be may provide service functions that may be shared by different applications or devices. For example, SC 206 may provide application enablement, reachability/addressing/repository functionality for applications, remote entity management, security, data retention, transaction management, compensation brokerage (charging), and/or act as an interworking proxy. SC 206 may provide other European Telecommunications Standards Institute (ETSI) M2M service capabilities. In an embodiment, xGC 204 may be integrated as part of SC 206. M2M Device/GW 202 may also include WiFi interface 208, which may allow M2M Device/GW 202 to connect to WiFi networks. M2M Device/GW 202 may also include UMTS interface 210, which may facilitate M2M Device/GW 202 to connect to UMTS networks. The UMTS interface is exemplary, and M2M Device/GW 202 may also include interfaces for LTE networks, WiMax networks and the like.

M2M Device/GW 202 may be in communication with Femto Access Point (FAP) 212. FAP 212 may be part of a radio access network (RAN) which provides M2M Device/GW 202 with radio access to a 3GPP network. FAP 212 may include a Home NodeB or may include a traditional NodeB. FAP 212 may include other nodes which facilitate radio access to a 3GPP network. For example, FAP 212 may include NodeB 214 and Radio Network Controller 216. NodeB 214 and Radio Network Controller 216 may be part of a RAN for a UMTS network. NodeB 214 may communicate with RNC 216 via an Iub interface.

FAP 212 may communicate with Home NodeB (HNB) Gateway (GW) 218, for example via an Iuh interface. HNB GW 218 may act as a gateway between FAP 212 and the core network (CN) of a 3GPP system. For example, HNB GW 218 may communicate with a 3GPP CN via an Iu interface. Continuing with this example, HNB GW 218 may communicate with Circuit-Switched CN 220 via an Iucs interface. HNB GW 218 may communicate with Packet-Switched CN 224 via an Iups interface. CS CN 220 and PS CN 224 may be logical partitions of a 3GPP CN. CS CN 229 may include MSC/VLR 222. MSC/VLR 222 may provide support for CS functionality for M2M Device/GW 202.

PS CN 224 may include SGSN 226. SGSN 226 may facilitate the delivery of data packets to and from WTRUs within a geographical or network service area. SGSN 226 may route and transfer packets, provide mobility management functionality, provide logical link management, authenticate WTRUs, provide fee charging services (such as billing user data), and the like. PSN CN 224 may include GGSN 228. GGSN 228 may facilitate operative communication between a 3GPP network and external networks such as the Internet and X.25 networks. For example, GGSN 228 may communicate with Packet Data Network (PDN) 232, for example via a Gi interface. PDN 232 may be any packet-based communication network. In an example, PDN 232 may provide M2M Network Application (App) 234 with a packet-based communication link for communication with PS CN 224. M2M Network App 234 may be an application being executed by a computing device which is meant to communicate with M2M Device/GW 202 and/or M2M Server 236. M2M Network App 234 may communicate with PDN 232 via an mIa interface, and may use various communication protocols such as a Constrained Application Protocol (CoAp), a Hypertext Transfer Protocol (HTTP), a Session Initiation Protocol (SIP), and/or the like. PS CN 224 may also include HLR 230, which may store location information and user profile information for devices in communication with the 3GPP network. The user profile information may be an example of subscriber data.

M2M Server 236 may include Network Generic Communication (NGC) interface 240 and Network Applications Enablement (NAE) function 238. NAE 238 may serve as a contact point for M2M applications within the network. In an example, CS CN 220, PS CN 224, and M2M Server 236 may be part of an operator owned network. GM2M may be a logical interface between SGSN 226 and M2M Server 236. Control data and/or user data from M2M Device/GW 202 may be communicated between SGSN 226 and M2M Server 236 via GM2M. In an example embodiment, control data from M2M Device/GW 202 may be communicated from SGSN 226 to M2M Server 236, while user data from M2M Device/GW 202 may be communicated from SGSN 226 to M2M Server 236 via GGSN 228. For example, control data may be sent from M2M Device/GW 202 to FAP 212 via UMTS interface 210. The control data may be routed from FAP 212 to HNB GW 218. The control data may be routed from HNB GW 218 to SGSN 226. SGSN 226 may then communicate the control data to M2M Server 236 via the GM2M interface. Continuing with this example, user data from M2M Device/GW 202 may be routed from to SGSN 226 in a manner similar to control data. However, in this example user data may be routed from SGSN 226 to GGSN 228, for example, via the Gn interface. GGSN 228 may then route the user data from M2M Device/GW 202 to M2M server 236, for example via an mla interface. The user data may be received by M2M Server via NAE 238, NGC 240 or another interface.

In an example, the GM2M interface may be for the control path (e.g., registration, security functions, authentication, etc.). By allowing M2M Server 236 to communicate directly with SGSN 226, SGSN 226 may perform user registration with M2M Server 236 without communicating through other network nodes or entities. The direct communication may provide for more efficient signaling within the CN, for example during an Attach procedure. Signaling of attach, authentication, and authorization may be performed via the GM2M interface, and other signaling and data path communications may be performed via the Gi interface. M2M Server 236 may receive control information via the GM2M interface without M2M Device/GW 202 establishing a PDP Context Activation and/or registering with M2M Server 236. To communicate via the Gi interface, a PDP context between the network and a device may have been established. An interface between GGSN 228 and M2M Server 236 may also be established. For example the interface between GGSN 228 and M2M Server 236 may be utilized for data (payload) traffic.

Procedures may be defined to facilitate connection of an M2M Server to a 3GPP network. For example, an M2M server may be connected with the SGSN of the 3GPP Core Network, e.g., on the GM2M Interface. For example, charging and billing functions of the M2M server and or 3GPP network may be integrated via the GM2M interface. Additionally, signaling overhead may be reduced by allowing communication directly between the SGSN and the M2M Server rather than routing all communications through the GGSN.

An M2M Server that is integrated within a 3GPP core network may communicate device specific information via the GM2M interface. The device specific information may be control information. For example, device identity information such as an International mobile Subscriber Identity (IMSI), an International Mobile Equipment Identity (IMEI), Packet Temporary Mobile Subscriber Identity (P-TMSI), and/or the like may be communicated via the GM2M interface. Location related information such as routing area (RA) information, location area (LA) information, tracking area (TA) information, and/or the like may be communicated via the GM2M interface. Security related information such integrity key, ciphering keys, and/or the like may be communicated via the GM2M interface. PDP context related information such as IP addressed, PDP type, and/or the like may be communicated via the GM2M interface.

A SGSN may recognize communications from an M2M device as an M2M communication. The SGSN may recognize that M2M communications may be routed to an M2M server. The SGSN may identify a device or a communication from a device as M2M related based on subscriber information. The SGSN may be M2M aware to the extent that it may associate M2M information with 3G WTRU/UE information. In an example, the M2M device may refrain from sending an indication that is an M2M device in each message. In this example, the SGSN may recognize that information from the M2M is M2M information based on the identity of the M2M device. For example, the device identity information may be subscriber information. In another example, the SGSN may recognize that information from the M2M device is M2M information based on an indication in a received message. The indication may be subscriber information. Additionally, an M2M device may be in communication with multiple SGSNs via multiple GM2M interfaces.

Subscriber information may be used by a SGSN to identify a M2M device. For example, When an M2M device initiates an attach procedure, an HLR may send default Access Point Name (APN) information along with other subscriber data to the SGSN. The subscriber data including the APN may be used to identify a M2M device. For example, the SGSN may be configured with a M2M APN, and may compare the M2M APN with the received APN included in the subscriber data. If the SGSN M2M APN matches the received APN included in the subscriber data, the SGSN may recognize the device associated with the subscriber data as an M2M device. The M2M APN may indicate that a device is an M2M device. Thus, a device may omit an indication of its M2M status, as the SGSN may recognize the device as M2M capable based on subscriber data associated with the device.

An M2M Server and a 3GPP network may use a combined authentication procedure. For example, a M2M capable WTRU may carry out generation of a cypher key (Ck) and an integrity key (Ik) during authentication with the network. The M2M capable WTRU may also carry out generation of M2M Device Session Ciphering Key (KsCk) and M2M device Session Integrity key (Kslk) as part of the same procedure. The authentication keys may be signaled to the network in one or more messages. The SGSN may receive the keys and forward the KsCk and Kslk to the M2M server via the GM2M interface.

In another example, an M2M device may identify itself as M2M capable in a Mobility Management (MM) message, a Global Multimedia Mobility (GMM) message, a call control (CC) message, and/or a Session Management (SM) message. For example, an M2M device may set the 8.sup.th bit of a MM message, a GMM message, a CC message, and/or a SM message to "1" to indicate that tit is M2M capable. In another example, a device may indicate that it is M2M capable using the attach type field of in a GMM Attach request message. For example, the SGSN may receive an indication in the attach type field that the device is an M2M device and may store an indication of the M2M capability of the device in memory. In another example, the skip indicator filed of Layer 3 (L3) messages may be set to "1111" to indicate that a device is M2M capable.

Figure 3:
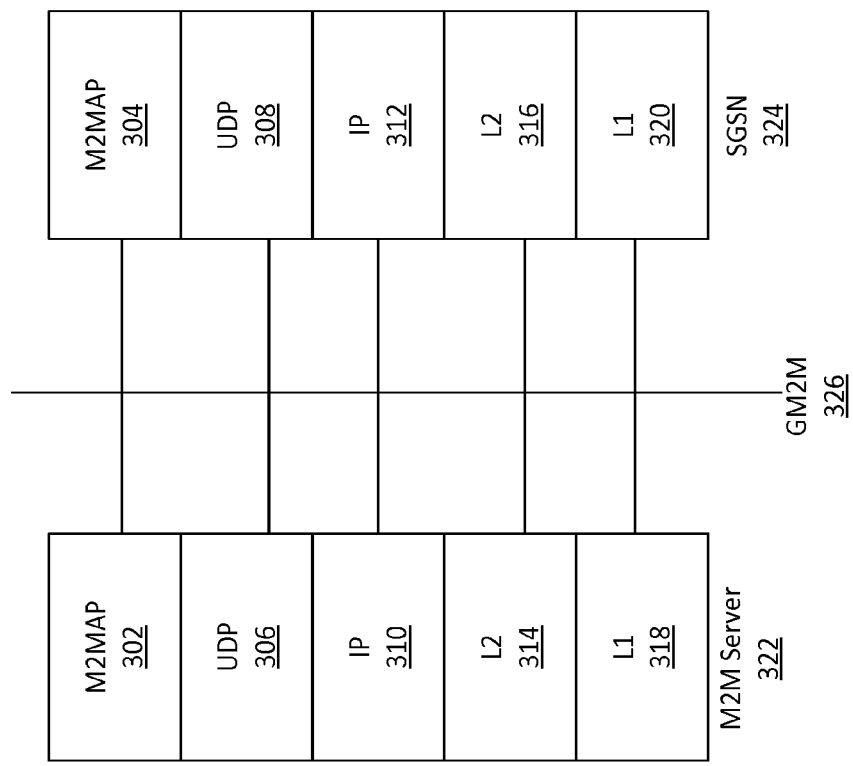
FIG. 3 illustrates an example communication protocol stack for communication of a GM2M interface.

FIG. 3 illustrates an example communication protocol stack for GM2M interface 326. GM2M 326 may be a logical interface, for example if M2M Server 322 is integrated as part of SGSN 324. In this example, GM2M 326 may be an internal interface inside of SGSN 324. M2MAP 302 may be an M2M application part protocol layer for M2M Server 322. M2MAP 304 may be an M2M application part protocol layer for SGSN 324. UDP 306 and UDP 308 may form the user datagram protocol (UDP) layer for the GM2M interface. In an example, the UDP destination port for M2MAP messages may be 2859. UDP port 2859 may be the registered port for M2MAP. M2M Server 322 may also include IP layer 310, L2 layer 314, and L1 layer 318. Similarly, SGSN 324 may include IP layer 312, L2 layer 316, and L1 layer 320. SGSN 324 and M2M Server 322 may include publicly addressable IP addresses.

M2MAP messages may have defined message formats with defined information elements. For example, Table 1, below, illustrates an exemplary M2MAP header. The contents of Table 1 may be fixed parts of the M2MAP header. The specific contents of each message (e.g., information elements) are discussed with reference to FIG. 4-11, below. For example, the protocol discriminator may use a value of "1110."

TABLE 1

M2MAP Header

| IEI | Information element | Type/Reference | Presence | Format | Length |
|---|---|---|---|---|---|
|  | M2MAP protocol discriminator | Protocol discriminator | M | V | ½ |
|  | Transaction Identifier | Transaction Identifier | M | V | ½ |
|  | <message type> | Message type | M | V | 1 |

Table 2, below, is a list of example M2MAP message types.

TABLE 2

M2MAP Message Types

| 8 | 7 | 6 | 5 | 4 | 3 | 2 | 1 | |
|---|---|---|---|---|---|---|---|---|
| 1 | — | — | — | — | — | — | — | M2MAP messages |
| 1 | 0 | 0 | 0 | 0 | 0 | 0 | 1 | M2M Device Attach Status Request |
| 1 | 0 | 0 | 0 | 0 | 0 | 1 | 0 | M2M Device Attach accept |
| 1 | 0 | 0 | 0 | 0 | 0 | 1 | 1 | M2M Device Attach complete |
| 1 | 0 | 0 | 0 | 0 | 1 | 0 | 0 | M2M Device Attach reject |
| 1 | 0 | 0 | 0 | 0 | 1 | 0 | 1 |  |
| 1 | 0 | 0 | 0 | 0 | 1 | 1 | 0 | M2M Device Detach accept |
| 1 | 0 | 0 | 0 | 1 | 0 | 0 | 0 | M2M Device Routing area Information Request |
| 1 | 0 | 0 | 0 | 1 | 0 | 0 | 1 | M2M Device Routing area update accept |
| 1 | 0 | 0 | 0 | 1 | 0 | 1 | 0 | M2M Device Routing area update complete |
| 1 | 0 | 0 | 0 | 1 | 0 | 1 | 1 | M2M Device Routing area update reject |
| 1 | 0 | 0 | 0 | 1 | 1 | 0 | 0 | M2M Device Security Mode Status Request |
| 1 | 0 | 0 | 0 | 1 | 1 | 0 | 1 | M2M Device Security Mode Complete |
| 1 | 0 | 0 | 0 | 1 | 1 | 1 | 0 | M2M Device Security Mode Reject |
| 1 | 0 | 0 | 1 | 0 | 0 | 0 | 0 | M2M Device Location Update |
| 1 | 0 | 0 | 1 | 0 | 0 | 0 | 1 | M2M Device Location Information Request |
| 1 | 0 | 0 | 1 | 0 | 0 | 1 | 0 | M2M Device Authentication and ciphering Status Request |
| 1 | 0 | 0 | 1 | 0 | 0 | 1 | 1 | M2M Device Authentication and ciphering resp |
| 1 | 0 | 0 | 1 | 0 | 1 | 0 | 0 | M2M Device Authentication and ciphering rej |
| 1 | 0 | 0 | 1 | 1 | 1 | 0 | 0 | M2M Device Authentication and ciphering failure |
| 1 | 0 | 0 | 1 | 0 | 1 | 0 | 1 |  |
| 1 | 0 | 0 | 1 | 0 | 1 | 1 | 0 |  |
| 1 | 0 | 1 | 0 | 0 | 0 | 0 | 0 |  |
| 1 | 0 | 1 | 0 | 0 | 0 | 0 | 1 |  |
| 1 | 1 | 0 | 0 | 0 | 0 | 0 | 1 | M2M Device Activate PDP context Status request |
| 1 | 1 | 0 | 0 | 0 | 0 | 1 | 0 | M2M Device Activate PDP context accept |
| 1 | 1 | 0 | 0 | 0 | 0 | 1 | 1 | M2M Device Activate PDP context reject |
| 1 | 1 | 0 | 0 | 0 | 1 | 0 | 0 | M2M Device Request PDP context activation |
| 1 | 1 | 0 | 0 | 0 | 1 | 0 | 1 | M2M Device Request PDP context activation rej. |
| 1 | 1 | 0 | 0 | 0 | 1 | 1 | 0 | M2M Device Deactivate PDP context request |
| 1 | 1 | 0 | 0 | 0 | 1 | 1 | 1 | M2M Device Deactivate PDP context accept |
| 1 | 1 | 0 | 0 | 1 | 0 | 0 | 0 | M2M Device Modify PDP context request(Network to MS direction) |
| 1 | 1 | 0 | 0 | 1 | 0 | 0 | 1 | M2M Device Modify PDP context accept (MS to network direction) |
| 1 | 1 | 0 | 0 | 1 | 0 | 1 | 0 | M2M Device Modify PDP context request(MS to network direction) |
| 1 | 1 | 0 | 0 | 1 | 0 | 1 | 1 | M2M Device Modify PDP context accept (Network to MS direction) |
| 1 | 1 | 0 | 0 | 1 | 1 | 0 | 0 | M2M Device Modify PDP context reject |
| 1 | 1 | 0 | 0 | 1 | 1 | 0 | 1 |  |
| 1 | 1 | 0 | 0 | 1 | 1 | 1 | 0 |  |
| 1 | 1 | 0 | 0 | 1 | 1 | 1 | 1 |  |
| 1 | 1 | 0 | 1 | 0 | 0 | 0 | 0 |  |
| 1 | 1 | 0 | 1 | 0 | 0 | 0 | 1 |  |
| 1 | 1 | 0 | 1 | 0 | 0 | 1 | 0 |  |
| 1 | 1 | 0 | 1 | 0 | 0 | 1 | 1 |  |

TABLE 2-continued

M2MAP Message Types

| 8 | 7 | 6 | 5 | 4 | 3 | 2 | 1 |
|---|---|---|---|---|---|---|---|
| 1 | 1 | 0 | 1 | 0 | 1 | 0 | 0 |
| 1 | 1 | 0 | 1 | 0 | 1 | 0 | 1 |
| 1 | 1 | 0 | 1 | 0 | 1 | 1 | 0 |
| 1 | 1 | 0 | 1 | 0 | 1 | 1 | 1 |
| 1 | 1 | 0 | 1 | 1 | 0 | 0 | 0 |
| 1 | 1 | 0 | 1 | 1 | 0 | 0 | 1 |
| 1 | 1 | 0 | 1 | 1 | 0 | 1 | 0 |
| 1 | 1 | 0 | 1 | 1 | 0 | 1 | 1 |
| 1 | 1 | 0 | 1 | 1 | 1 | 0 | 0 |

Figure 4:
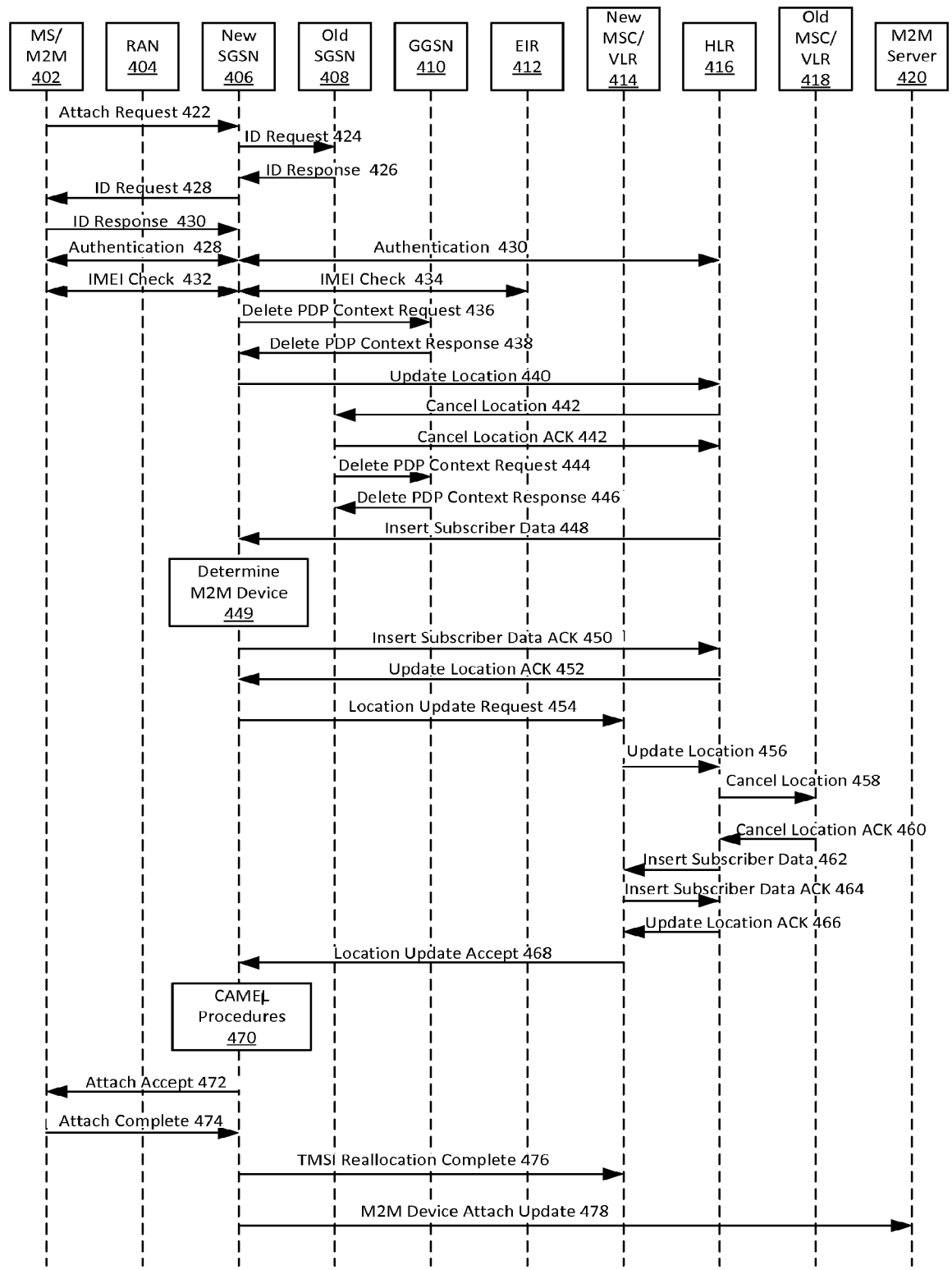
FIG. 4 illustrates an example M2M device attach procedure in accordance with an embodiment.

FIG. 4 illustrates an example attach procedure in accordance with an embodiment. For example the attach procedure may be a combined GPRS/IMSI Attach procedure. A Device Attach Update procedure may be defined in order to inform M2M Server 420 of MS/M2M 402 performing a successful or unsuccessful attach procedure. For example, MS/M2M 402 may send Attach Request 422 to New SGSN 406, for example via RAN 404. Attach Request 422 may include a IMSI, a P-TMSI, an old Routing Area Identity (RAI), a classmark, a Cyphering Key Sequence Number (CKSN), an Attach Type, Discontinuous reception (DRX) parameters, an old P-TMSI and/or the like. New SGSN 406 may send ID Request 424 to Old SGSN 408, for example to request a IMSI for MS/M2M 402 if it was omitted from the attach request, and in response may receive ID Response 426 which may identify MS/M2M 402, for example by IMSI. Alternatively, or supplemental to ID request 424, New SGSN 406 may send ID Request 428 to MS/M2M 402, for example to request a IMSI for MS/M2M 402 if it was omitted from the attach request, and in response may receive ID Response 426 which may identify MS/M2M 402, for example by IMSI.

New SGSN 406 may facilitate Authentication 428 and Authentication 430 between MS/M2M 402 and HLR 416, respectively. If a PDP context had previously existed for MS/M2M 402, New SGSN 406 may send Delete PDP Context request 436 to GGSN 410. In response, GGSN 410 may send Delete PDP Context Response 438. New SGSN 406 may send Update Location 440 to HLR 416, for example, if a SGSN number has changed since a previous GPRS detach or if Attach Request 422 was the first attach request by MS/M2M 402. Update Location 440 may include a SGSN number, a SGSN address, an IMSI for MS/M2M 402, and/or IMEI software version (IMEISV). HLR 416 may send Cancel Location 442 to Old SGSN 408, for example to delete MM and PDP contexts. Old SGSN 408 may respond with Cancel Location ACK 442 upon cancellation of procedures related to MS/M2M 402. To delete an old PDP context, for example if the contexts have yet to be deleted, Old SGSN 408 may send Delete PDP Context request 44 to GGSN 410. GGSN may delete the old PDP context for MS/M2M 402 and respond with Delete PDP Context Response 436.

HLR 416 may send Insert Subscriber Data 448 to New SGSN 406, which may include subscriber data for MS/M2M 402. The subscriber data may include an IMSI, GPRS subscription data and/or an APN for MS/M2M 402. The APN may be a default APN for M2M devices. At 449, New SGSN 406 may determine that MS/M2M 402 is an M2M capable device, for example based on the received APN. As an example, New SGSN 406 may compare the received APN with a default APN for M2M devices. New SGSN 406 may acknowledge the receipt of the subscriber data, for example by sending Insert Subscriber Data ACK 450. HLR 416 may acknowledge the creation of a new MM context and/or successful location update by sending Location update ACK 452 to New SGSN 406. Old SGSN 406 may inform New MSC/VLR 414 of the location update for MS/M2M 402 by sending Location update Request 454. If the location update is inter-MSC (i.e., more than one MSC is involved), New MSC/VLR 414 may send update Location 456 to HLR 416. HLR 416 may send Cancel Location 458 to Old MSC/VLR 418. Old MSC/VLR 418 may respond with Cancel Location ACK 460. HLR 416 may send Insert Subscriber Data 462 to New MSC/VLR 414, which may include subscriber data for MS/M2M 402. The subscriber data may include an IMSI, GPRS subscription data and/or an APN for MS/M2M 402. The APN may be a default APN for M2M devices. New MSC/VLR 414 may acknowledge the receipt of the subscriber data, for example by sending Insert Subscriber Data ACK 464. HLR 416 may send update Location ACK 466 to New MSC/VLR 414. New MSC/VLR 414 may indicate location acceptance by sending Location Update Accept 468 to New SGSN 406.

New SGSN 406 may then process the location update by performing Customized Applications for Mobile Network Logic (CAMEL) Procedures 470. New SGSN 406 may send Attach Accept 472 to MS/M2M 402 indicating that the attach procedure was successful and is complete. MS/M2M 402 may acknowledge Attach Accept 472 by sending Attach Complete 474. Optionally. New SGSN 406 may send TMSI Reallocation Complete 476, for example if VLR TMSI was changed.

Regardless of whether the attach procedure was successful or unsuccessful, New SGSN 406 may send M2M Device Attach Update 478 to M2M server 420. M2M Device Attach Update 478 may be sent from New SGSN 406 to M2M Server 420 via the GM2M interface. A Device Attach message may use a skip indicator field to indicate it is an M2M procedure. The SGSN may interpret the skip indicator field. In another embodiment, a WTRU may use an attach type field in GMM ATTACH REQUEST MESSAGE to indicate it is an M2M device. The SGSN may interpret the type of attach field and send DEVICE ATTACH UPDATE to the M2M Server at the end of attach procedure.

There may be several types of M2M Device Attach Update messages that a SGSN may send to an M2M based on an attach procedure. For example, when an SGSN sends an Attach Accept Message to a M2M device, it may also send a M2M Device Attach Accept type M2M Device Attach Update message to the M2M Server via the GM2M interface. In another example, when an SGSN sends an Attach Reject Message to a M2M device, it may also send a M2M Device Attach Reject type M2M Device Attach Update message to the M2M Server via the GM2M interface. In yet another example, when the SGSN receives an Attach complete Message from an M2M device, it may send a M2M Device Attach Complete type M2M Device Attach Update message to the M2M server via the GM2M interface. Example information elements for M2M Device Attach Update messages (e.g., attach accept/reject/complete type messages) are shown in Table 3, below.

TABLE 3

Information Elements for M2M Device Attach Update Messages

| IEI | Information Element | Type/Reference | Presence | Format | Length |
|---|---|---|---|---|---|
| | Attach result | Attach result | O | V | ½ |
| | P-TMSI signature | P-TMSI signature | M | TV | 4 |
| | GMM cause | GMM cause | O | V | 1 |
| | P-TMSI | Mobile identity | M | LV | 6-9 |
| | IMSI | Mobile identity | M | LV | 6-9 |

Additionally, a M2M server may send a M2M Device Attach Status Request message to a SGSN to determine an attach status of an M2M device. The M2M Device Attach Status Request message may be sent via the GM2M server to the SGSN. An example information element for a M2M Device Attach Status request messages is shown in Table 4, below.

TABLE 4

Information Elements for M2M Device Attach Status Messages

| IEI | Information Element | Type/Reference | Presence | Format | Length |
|---|---|---|---|---|---|
| | IMSI | Mobile identity | M | LV | 6-9 |

Figure 5:
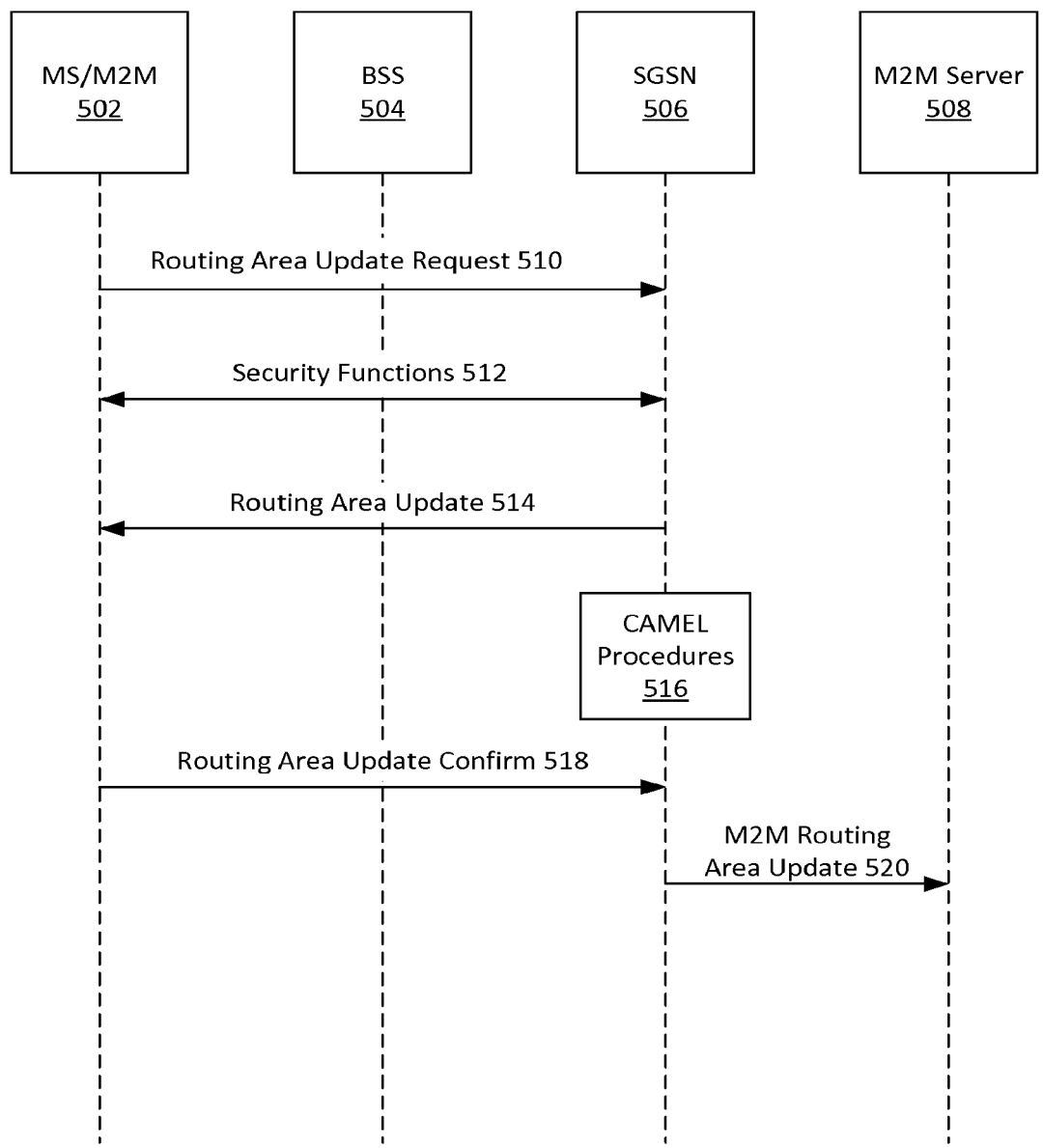
FIG. 5 illustrates an example M2M device routing area update procedure in accordance with an embodiment.

FIG. 5 illustrates an example routing area update procedure in accordance with an embodiment. MS/M2M 502 may send Routing Area Update request 510 to SGSN 506. Routing Area Update Request 510 may indicate that MS/M2M 502 may have entered a new routing area or may be a periodic routing area update. Routing Area Update request 510 may include a P-TMSI, an old RAI, an old P-TMSI Signature, an Update Type and the like. Base Station Subsystem (BSS) 504 may add a Cell Global Identity prior to forwarding Routing Area Update Request 510 to SGSN 506. Security Functions 512 may be executed between MS/M2M 502 and SGSN 506. Upon validating that MS/M2M 502 is allowed in the new RA and updating MM contexts. SGSN 506 may send Routing Area update 514 to MS/M2M 502. SGSN 506 may perform CAMEL Procedures 516 to process the Routing Area Update. MS/M2M 502 may send Routing Area Update Confirm 518 to SGSN 506 to confirm the routing area update is complete. In an example, SGSN 506 may associate information from M2/M2M 502 with M2M information. For example, the SGSN may have determined MS/M2M 502 was a M2M device in an earlier transaction (such as an attach). SGSN 506 may send M2M Routing Area Update 520 to M2M Server 508, for example via the GM2M interface.

There may be several types of M2M Device Routing Area Update messages that a SGSN may send to an M2M server based on a Routing Area procedure. For example, when an SGSN sends a Routing Area Update Accept Message to a M2M device, it may also send a M2M Device Routing Area Update Accept type M2M Device Routing Area Update message to the M2M Server via the GM2M interface. In another example, when an SGSN sends a Routing Area Update Reject Message to a M2M device, it may also send a M2M Device Routing Area Update Reject type M2M Device Routing Area Update message to the M2M Server via the GM2M interface. In yet another example, when the SGSN receives a Routing Area Update Complete message from a M2M device, it may send a M2M Device Routing Area Update Complete type M2M Device Routing Area Update message to the M2M server via the GM2M interface. Example information elements for M2M Device Routing Area Update messages (e.g., Routing Area Update Accept/Reject/Complete type messages) are shown in Table 5, below.

TABLE 5

Information Element for M2M Device Routing Area Update Message

| IEI | Information Element | Type/Reference | Presence | Format | Length |
|---|---|---|---|---|---|
| | IMSI | Mobile identity | M | LV | 6-9 |
| | Routing area identification | Routing area identification | M | V | 6 |
| | GMM cause | GMM cause | M | V | 1 |

Additionally, a M2M server may send a M2M Device Routing Area Information Request message to a SGSN to determine routing area information status of an M2M device. The M2M Device Routing Area Information Request message may be sent via the GM2M interface. An example information element for a M2M Device Routing Area Information Request message is shown in Table 6, below.

TABLE 6

Information Elements for M2M Device Routing Area Information Request Messages

| IEI | Information Element | Type/Reference | Presence | Format | Length |
|---|---|---|---|---|---|
| | IMSI | Mobile identity | M | LV | 6-9 |

Figure 6:
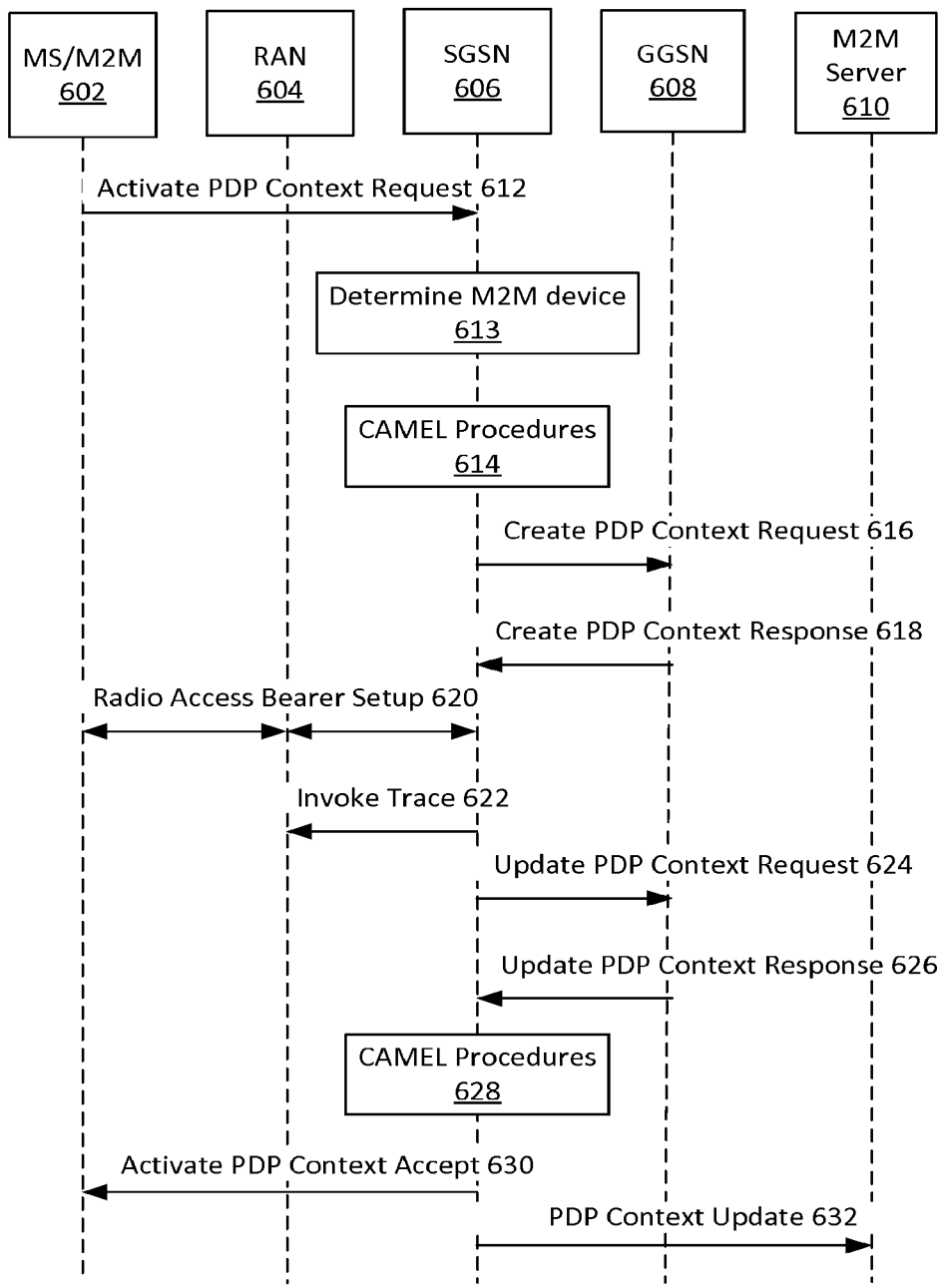
FIG. 6 illustrates an example M2M device initiated Packet Data Protocol (PDP) context activation procedure in accordance with an embodiment.

FIG. 6 illustrates an example PDP Context Update procedure in accordance with an embodiment. MS/M2M 602 may send Activate PDP Context Request 612 to SGSN 606. Activate PDP Context Request 612 may include a Network Service Access Point Identifier (NSAPI), a Transaction Identifier (TI), a PDP type, a PDP Address, an APN, a Quality of Service (QoS) Request, Protocol Configuration options of the like. At 613, SGSN 606 may determine that MS/M2M 602 is M2M capable, for example based on a received APN, IMSI or other identifier. SGSN 606 may perform CAMEL Procedures 614 to process Activate PDP Context Request 612 and PDP Context establishment. SGSN 606 may validate the PDP Context request. If SGSN 606 is unable to validate the request, it may send MS/M2M 602 an Activate PDP Context Reject Message (Not shown in FIG. 6). However, to create the PDP Context, SGSN 606 may send Create PDP Context Request 616 to GGSN 608. GGSN

608 may choose to accept or reject the request. If accepted, GGSN 608 may send Create PDP Context Response 618 to SGSN 606.

MS/M2M 602, RAN 604 and SGSN 606 may engage in Radio Access Bearer Setup 620. If BSS trace is activated, SGSN may send Invoke trace 622 to RAN 604. SGSN 606 may also send Update PDP Context request 624 to GGSN 608, for example if during Radio Access Bearer Setup 620 there was a QOS change for MS/M2M 602. If so, GGSN may respond with Update PDP Context Response 626. SGSN 606 may perform further CAMEL Procedures 628 to acknowledge PDP Context establishment. SGSN may send Activate PDP Context Accept 630 to MS/M2M 602, which may indicate that a PDP context was successfully established. Following transfer of Activate PDP Context Accept 630 to MS/M2M 602, SGSN 606 may send PDP Context Update 632 to M2M Server 610 to inform M2M Server 610 of the new PDP Context for MS/M2M 602. PDP Context Update 632 may be sent via the GM2M interface.

There may be several types of M2M Device PDP Context Activation Update messages that a SGSN may send to an M2M Server based on a Routing Area procedure. For example, when a SGSN sends an Activate PDP Context Accept message to a M2M device, it may also send a M2M Device Activate PDP Context Accept type M2M Device PDP Context Activation Update message to the M2M Server via the GM2M interface. In another example, when an SGSN sends an Activate PDP Context Reject Message to a M2M device, it may also send a M2M Device Activate PDP Context Reject type M2M Device PDP Context Activation Update message to the M2M Server via the GM2M interface. In yet another example, when the SGSN receives a Modify PDP Context Accept message from a M2M device, it may send a M2M Device Modify PDP Context Accept type M2M Device PDP Context Activation Update message to the M2M server via the GM2M interface. Similarly, a SGSN may send a Modify PDP Context Accept message to a M2M device, in which case it may still send a M2M Device Modify PDP Context Accept type M2M Device PDP Context Activation Update message to the M2M server via the GM2M interface. A SGSN may also send or receive a Modify PDP Context Reject message, and in either case the SGSN may send a M2M Device Modify PDP Context Reject type M2M Device PDP Context Activation Update message to the M2M server via the GM2M interface. Example information elements for M2M Device PDP Context Activation Update messages are shown in Table 7, below.

TABLE 7

Information Element for M2M Device PDP Context Activation Update Message

| IEI | Information Element | Type/Reference | Presence | Format | Length |
| --- | --- | --- | --- | --- | --- |
| | IMSI | Mobile identity | M | LV | 6-9 |
| | Negotiated QoS | Quality of service | M | LV | 13-17 |
| | Radio priority | Radio priority | M | V | ½ |
| | PDP address | Packet data protocol address | O | TLV | 4-20 |
| | SM cause | SM Cause | M | V | 1 |

Figure 7:
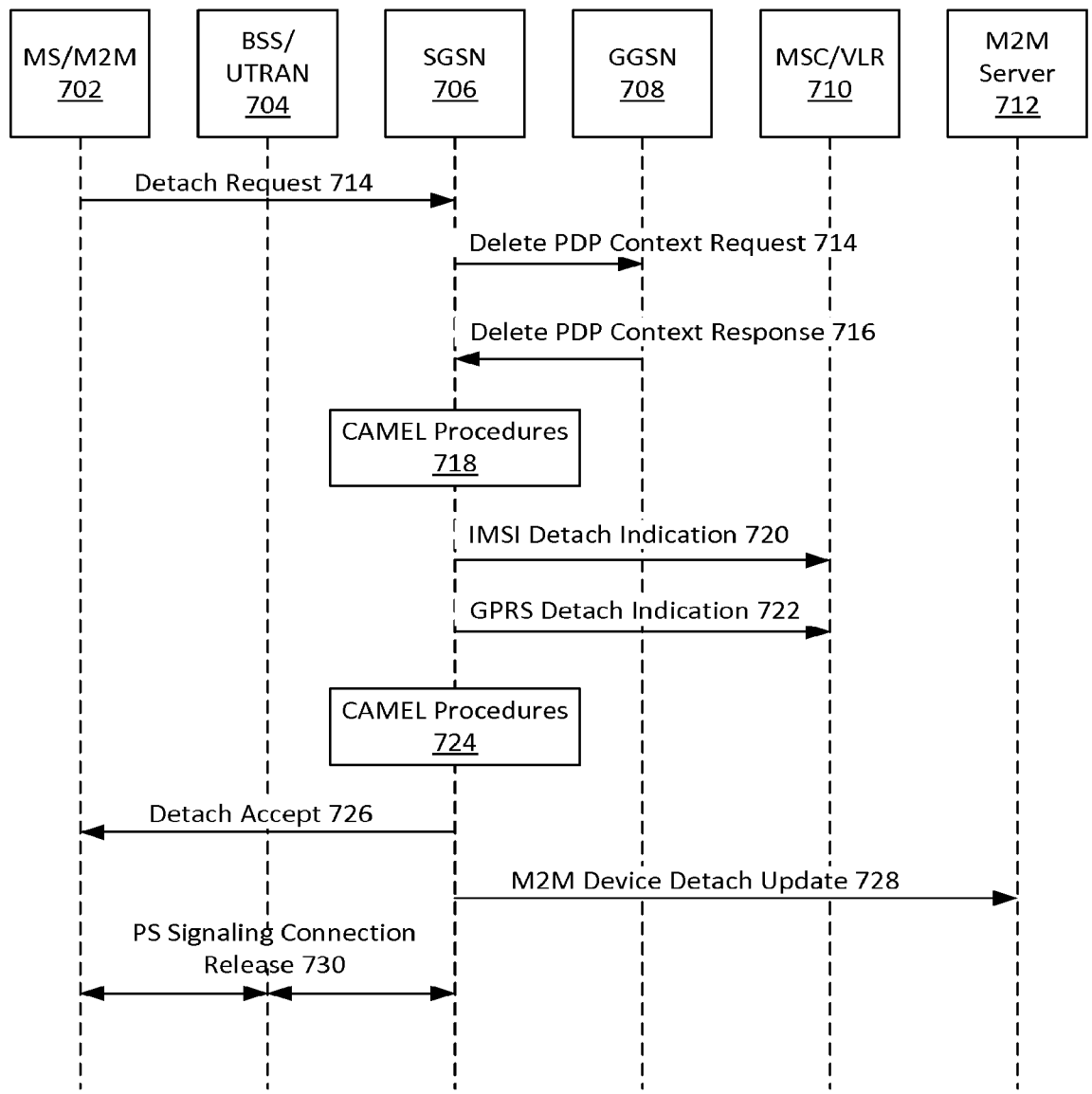
FIG. 7 illustrates an example M2M device detach procedure in accordance with an embodiment.

FIG. 7 illustrates an example device detach procedure in accordance with an embodiment. MS/M2M 702 may send Detach Request 714 to SGSN 706. Detach Request 714 may indicate that MS/M2M 502 desires to detach from the network and may include a detach type, a P-TMSI, a P-TSMI signature, a switch off notification and/or the like. SGSN 706 may send GGSN 708 Delete PDP Context Request 714. In response, GGSN 708 may delete the PDP Context for MS/M2M 702 and send SGSN 706 Delete PDP Context response 716. SGSN 706 may perform CAMEL Procedures 718 to process the PDP Context deletion. SGSN 706 may send IMSI Detach Indication 720 to MSC/VLR 710, for example if Detach Request 714 indicates that the detach procedure is an IMSI detach procedure. SGSN 706 may send GPRS Detach Indication 722 to MSC/VLR 710, for example if Detach Request 714 indicates that the detach procedure is a GPRS detach procedure. SGSN 706 may perform CAMEL Procedures 724 to process detach. SGSN 706 may send Detach Accept 726 to MS/M2M 702 to indicate the detach procedure was successful. SGSN 706 may send M2M Device Detach Update 728 to M2M Server 712, for example via the GM2M interface, in order to inform M2M Server 712 of the detach procedure. MS/M2M 702, BSS/UTRAN 704, and/or SGSN 706 may also perform PS Signaling Connection Release 730. Example information elements for M2M Device Detach Accept Messages are shown in Table 8, below.

TABLE 8

Information Element for M2M Device Detach Update Message

| IEI | Information Element | Type/Reference | Presence | Format | Length |
| --- | --- | --- | --- | --- | --- |
| | P-TMSI or IMSI | Mobile identity | M | LV | 6-9 |
| | GMM cause | GMM cause | O | V | 1 |

Figure 8:
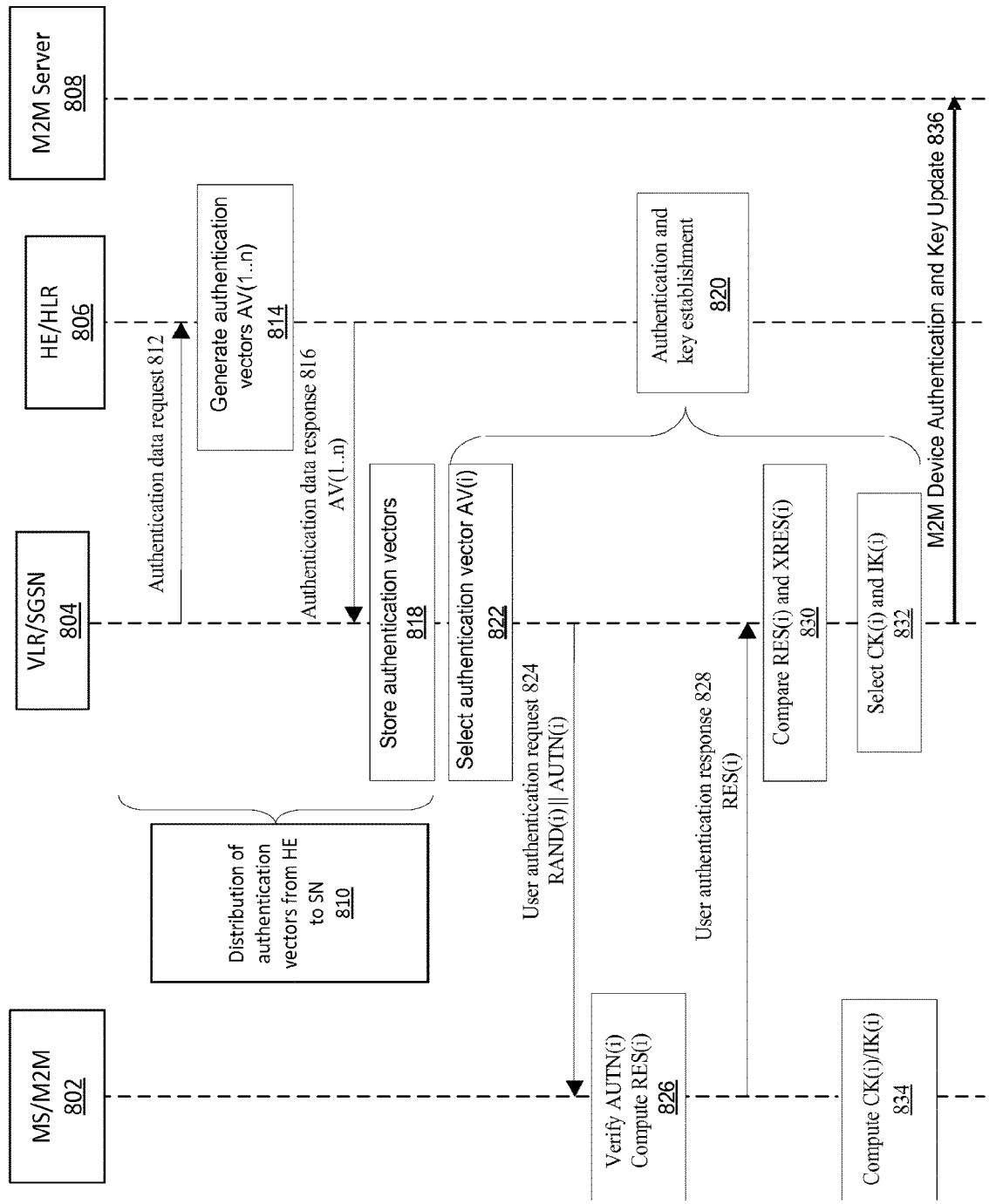
FIG. 8 illustrates an example authentication and cyphering procedure in accordance with an embodiment.

FIG. 8 illustrates an example authentication and key agreement procedure in accordance with an embodiment. The authentication and key agreement procedure may begin with distribution of authentication vectors from Home Environment (HE) to the Serving Network (SN) at 810. VLR/SGSN 804 may send Authentication Data Request 812 to HE/HLR 806. In response, at 814 HE/HLR 806 may generate authentication vectors and transmit the authentication vectors to VLR/SGSN 804 as part of Authentication data response 816. Each authentication vector may include a random number (RAND), an expected response (XRES), a cipher key (CK), an integrity key (IK), and an authentication token (RUTH). At 818, VLR/SGSN 804 may store the authentication vectors.

At 820, MS/M2M 802 and VLR/SGSN 804 may engage in authentication and key establishment. VLR/SGSN 804 may select an authentication vector (AV), for example the ith AV (AV(i)), where n may be the number of authentication vectors and 1<=i<=n. VLR/SGSN 804 may transmit user authentication request 824 to MS/M2M 802. User authentication request 824 may include RAND(i) and AUTH(i), which may be the random number and the authentication token for AV(i), respectively. At 826, MS/M2M 802 may verify AUTN(i), for example by checking a Universal Subscriber Identity Module (USIM), and may compute a response based on AV91) (RES(i)). MS/M2M 802 may send RES(i) to VLR/SGSN 804 as part of User authentications response 828. At 830, VLR/SGSN 804 may compare RES(i) and XRES(i). If RES(i) and XRES(i) match, VLR/SGSN 804 may consider the authentication and key agreement exchange to be successfully completed. At 832, VLR/SGSN 804 may select CK(i) and IK(i) as the cyphering and integrity keys. Similarly, at 834, MS/M2M 802 may compute CK(i) and IK(i). VLR/SGSN 804 may send M2M Device Authentication and Key Update 836 to M2M Server 808, for example via the GM2M interface, to inform M2M Server of the successful authentication and key agreement.

There may be several types of M2M Device Authentication and Key Agreement Update messages that a SGSN may send to an M2M server based on an authentication, key agreement and/or cyphering procedure. For example, when a SGSN receives an Authentication and Key Agreement Response Message from a M2M device, it may also send a M2M Device Authentication and Key Agreement Response type M2M Device Authentication and Key Agreement Update message to the M2M Server via the GM2M interface. In another example, when an SGSN receives an Authentication and Key Agreement Reject Message from a M2M device, it may also send a M2M Device Authentication and Key Agreement Reject Message type M2M Device Authentication and Key Agreement Update message to the M2M Server via the GM2M interface. In yet another example, when the SGSN receives an Authentication and Key Agreement Failure Message from a M2M device, it may send a M2M Device Ro Authentication and Key Agreement Failure type M2M Device Authentication and Key Agreement Update message to the M2M server via the GM2M interface. Example information elements for M2M Device Authentication and Key Agreement Update messages (e.g., Authentication and Key Agreement Failure/Accept/Reject type messages) are shown in Table 9, below. As an example a reject message may include a reject reason and/or the ciphering and/or integrity keys.

TABLE 9

Information Elements for M2M Device Authentication and Key Agreement Update Messages

| IEI | Information Element | Type/Reference | Presence | Format | Length |
|---|---|---|---|---|---|
| | IMSI | Mobile identity | M | LV | 6-9 |
| | Ciphering Key | Encryption Information | O | V | 16 |
| | Integrity Key | Integrity Protection Information | O | V | 16 |
| | Reject Cause | Reject Cause | O | V | 1 |

Additionally, a M2M server may send a M2M Device Authentication and Key Agreement Request message to a SGSN to determine authentication and key agreement status of an M2M device. The M2M Device Authentication and Key Agreement Request message may be sent via the GM2M interface. An example information element for a M2M Device Authentication and Key Agreement Request message is shown in Table 10, below,

TABLE 10

Information Element for M2M Device Authentication and Key Agreement Request Messages

| IEI | Information Element | Type/Reference | Presence | Format | Length |
|---|---|---|---|---|---|
| | IMSI | Mobile identity | M | LV | 6-9 |

Figure 9:
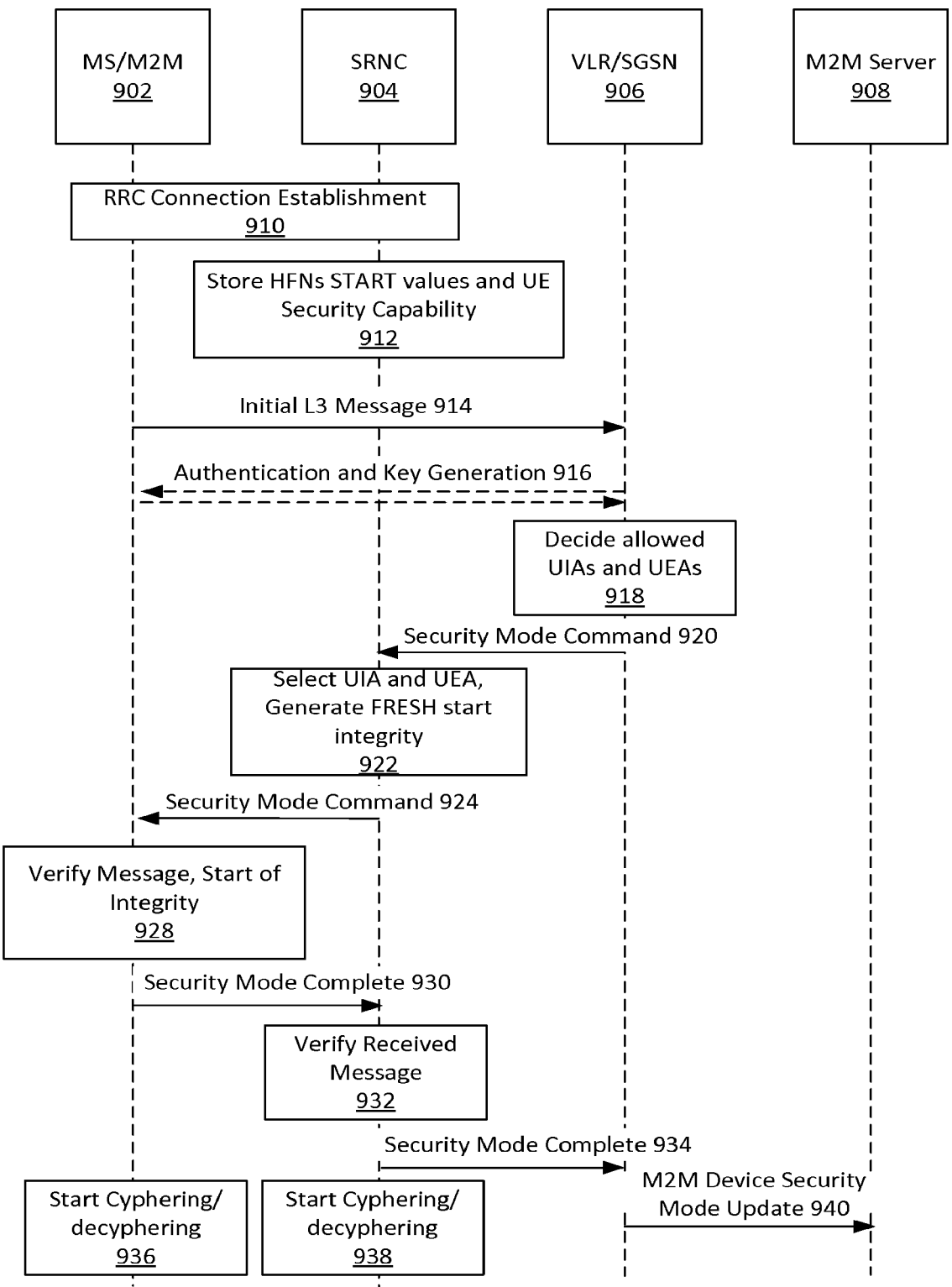
FIG. 9 illustrates an example security mode procedure in accordance with an embodiment.

FIG. 9 illustrates an example security mode update procedure in accordance with an embodiment. At 910, Radio Resource Control (RRC) Connection Establishment may be performed between MS/M2M 902 and Serving Radio Network Controller (SRNC) 904. At 912, SRNC 904 may store Hyper Frame Number (HFN) START values and UE Security Capability. MSM/M2M 902 may send Initial L3 Message 914 to VLR/SGSN 906. For example, Initial L3 Message 914 may be a location update request, a Connection Management (CM) service request a routing area update request, an attach request, a paging response, or the like. At 916, MS/M2M 902 may perform authentication and key generation, for example, as described with respect to FIG. 8. At 918, VLR/SGSN 906 may decide allowed UE cyphering capabilities (UIAs) and integrity capabilities (UEAs). VLR/SGSN 906 may send Security Mode Command 920 to SRNC 904, which may include UTAs, IK, UEAs, CK, and/or the like. At 922, SRNC 904 may generate a random value (FRESH) and may initiate downlink integrity protection.

SRNC 904 may send Security Mode Command 924 to MS/M2M 902. Security Mode Command 924 may include a CN domain, a UIA, FRESH, a UE security capability, UEA, Message Authentication Code for Integrity (MAC-I), and/or the like. At 928, MS/M2M may verify the message and start integrity security. MS/M2M 902 may indicate that the security mode procedure was successful by sending Security Mode Complete 930. At 932, SRNC 904 may verify Security Mode Complete 930 has been received. SRNC 904 may send Security Mode Complete to VLR/SRNC 906. At 936, MS/M2M 902 may start cyphering/deciphering. At 938, SRNC 904 may start cyphering/deciphering. VLR/SRNC 906 may send M2M Device Security Mode Update 940 to M2M Server 908, for example via the GM2M interface.

There may be several types of M2M Device Security Mode Update messages that a SGSN may send to an M2M server based on a security mode procedure. For example, when a SGSN receives a Security Mode Complete Message from a RNC, it may also send a M2M Device Security Mode Complete type M2M Device Security Mode Update message to the M2M Server via the GM2M interface. In another example, when an SGSN receives a Security Mode Reject Message from a RNC, it may also send a M2M Device Security Mode Reject Message type M2M Device Security Mode Update message to the M2M Server via the GM2M interface. Example information elements for M2M Device Authentication and Key Agreement Update messages (e.g., Authentication and Key Agreement Failure/Accept/Reject type messages) are shown in Table 9, below. As an example, SGSN may store an indication that the M2M device is M2M capable from an earlier communication session.

TABLE 11

Information Elements for M2M Device Security Mode Update Messages

| IEI | Information Element | Type/Reference | Presence | Format | Length |
|---|---|---|---|---|---|
| | IMSI | Mobile identity | M | LV | 6-9 |
| | Ciphering Key | Encryption Information | O | V | 16 |
| | Integrity Key | Integrity Protection Information | O | V | 16 |
| | Cause | Cause | O | TLV | 8 |

Additionally, a M2M server may send a M2M Security Request message to a SGSN to determine security mode status of an M2M device. The M2M Device Security Mode Request message may be sent via the GM2M interface. An example information element for a M2M Device Security Mode Request message is shown in Table 12, below.

TABLE 12

Information Element for M2M Device Security Mode Request Messages

| IEI | Information Element | Type/Reference | Presence | Format | Length |
|---|---|---|---|---|---|
| | IMSI | Mobile identity | M | LV | 6-9 |

Figure 10:
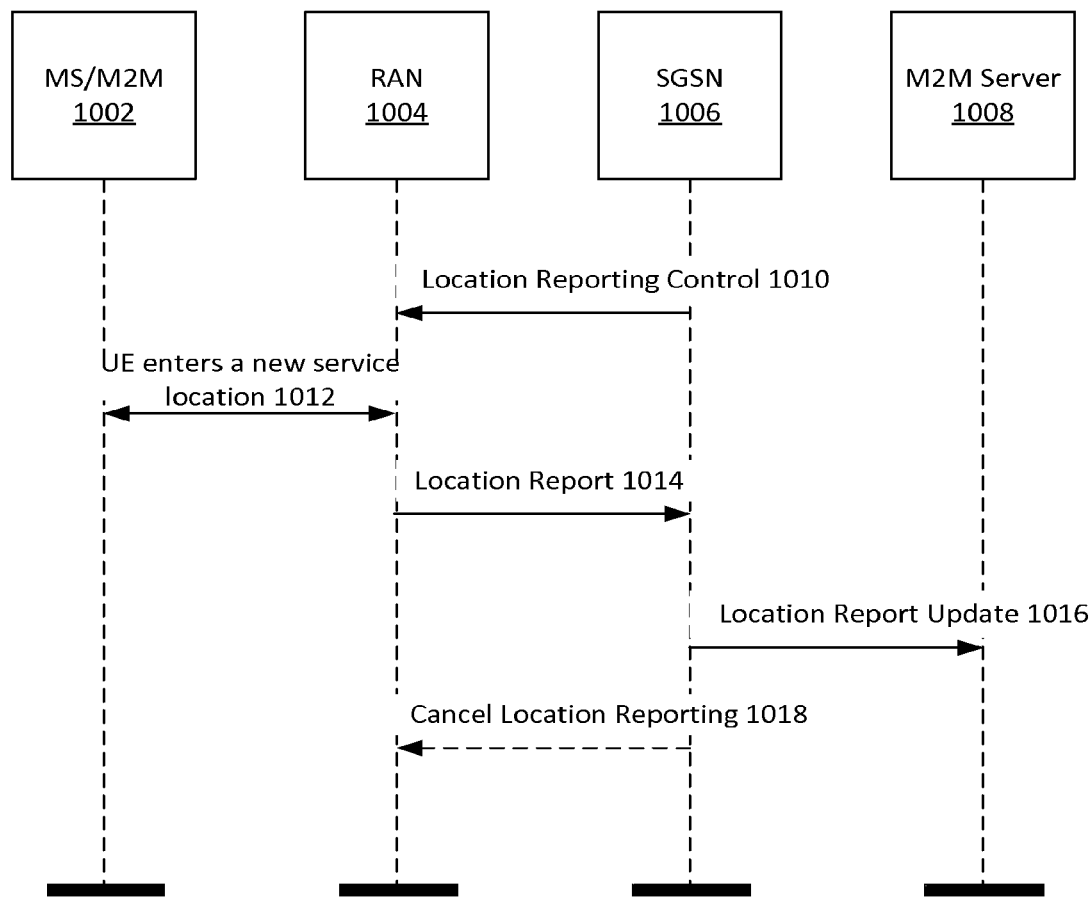
FIG. 10 illustrates an example location reporting control procedure in accordance with an embodiment.

FIG. 10 illustrates an example location reporting control procedure in accordance with an embodiment. SGSN 1006 may send Location Reporting Control 1010 to RAN 1004. For example, SGSN 1006 may send Location reporting Control 1010 because it detects form subscriber data for MS/M2M 1002 that SGSN 1006 should monitor the service area in which MS/M2M 1002 is located. Location reporting Control 1010 may trigger a periodic or standalone report about the current location of MS/M2M 1002. RAN 1004 may store the report, for example if periodic reporting is requested. In another example, SGSN 1006 may request to be notified if MS/M2M 1002 moves into or out of a determined service region. At 1012, MS/M2M 1002 may move to a new service location, which may be in a reporting area request in Location Reporting Control 1010. RAN 1004 may determine the location of MS/M2M 1002 and send Location report 1014 to SGSN 1006. SGSN 1006 may inform M2M server 1008 of the location of MS/M2M 1002. For example, SGSN 1006 may send M2M Device Location Report Update 1016 to M2M Server 1008, for example via the GM2M interface. Optionally, SGSN 1006 may cancel an early location report request, for example by sending Cancel Location reporting 1018 to RAN 1004. Example information elements for M2M Device Location Report Update messages are shown in Table 13, below. As an example, SGSN may store an indication that the M2M device is M2M capable from an earlier communication session.

TABLE 13

Information Elements for M2M Device Location Reporting Update Messages

| IEI | Information Element | Type/Reference | Presence | Format | Length |
|---|---|---|---|---|---|
| | IMSI | Mobile identity 10.5.1.4 | M | LV | 6-9 |
| | Area Identity | Area Identity | O | V | As defined in [7] |
| | Last Known Service Area | Last known Service Area | O | V | As defined in [7] |
| | Position Data | Position Data | O | V | As defined in [7] |

Additionally, a M2M server may send a M2M Security Request message to a SGSN to request a location report status of an M2M device. The M2M Device Location Reporting Request message may be sent via the GM2M interface. An example information element for a M2M Device Location Reporting Request message is shown in Table 14, below.

TABLE 14

Information Element for M2M Device Location Reporting Request Messages

| IEI | Information Element | Type/Reference | Presence | Format | Length |
|---|---|---|---|---|---|
| | IMSI | Mobile identity | M | LV | 6-9 |

Figure 11:
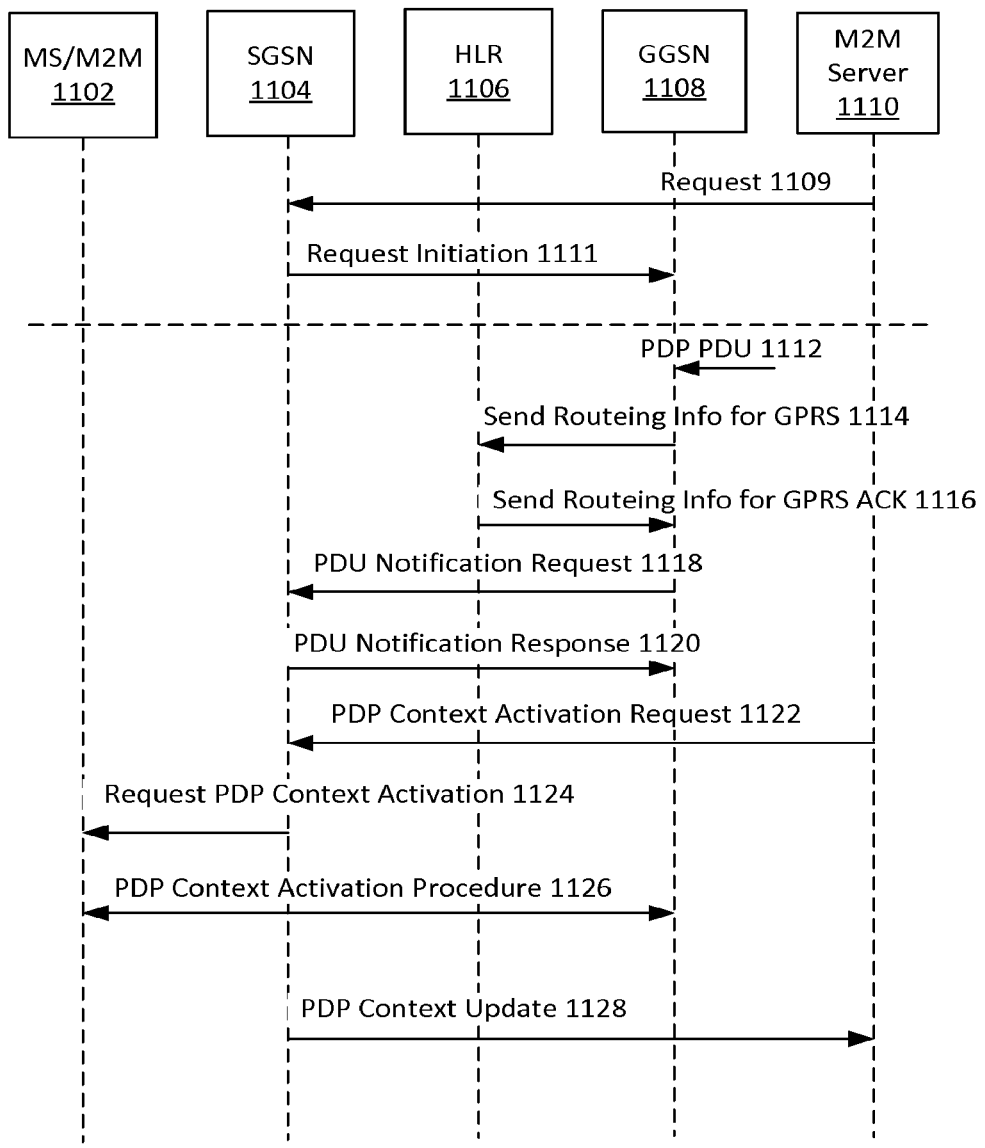
FIG. 11 illustrates an example network initiated PDP context activation procedure in accordance with an embodiment.

FIG. 11 illustrates an example network initiated PDP Context Activation procedure in accordance with an embodiment. In this example, the control procedure may be initiated by M2M Server 1110 or may be initiated by a cellular network node. For example, if M2M server 1110 is initiating a network control procedure (for example a PDP context activation procedure as shown in FIG. 11), M2M Server 110 may send Request 1109 to SGSN 1104, for example via the GM2M interface. Request 1109 may be a M2M Device PDP Context Activation/Modification Request Message. SGSN 1104 may send Request Initiation 1111 to GGSN 1108 which may initiate a network control procedure such as a PDP context activation procedure. In another example, the PDP context activation procedure may be initiated by a cellular network node. In this example, GGSN 1108 may receive PDP Protocol Data Unit (PDU) 1112 from the cellular network node. In another example, PDP PDU 1112 may be sent from M2M Server 1110 directly to GGSN 1108.

GGSN 1108 may determine if a Network-requested PDP Context Activation procedure should be activated. GGSN 1108 may send Routing Information for GPRS 114 to HLR 1106. If HLR 1106 determined the request may be served, HLR 110 may send Routing Information for GPRS ACK 1116 to GGSN 1108. GGSN 1108 may send PDU Notification Request 1118 to SGSN 1104, whose identity may be indicated by HLR 1106. SGSN 1104 may send PDU Notification Response 1120, which may indicate that it will inform MS/M2M 1102 to activate the PDP context indicated. SGSN 1104 may send Request PDP Context Activation 1124 to MS/M2M 1102. Upon receipt of Request PDP Context Activation 1124, MS/M2M 1102 may perform PDP Context Activation Procedure 1126 with GGSN 1108. Upon successful completion of PDP Context Activation Procedure 1126 (or unsuccessful completion), SGSN 1104 may send PDP Context Update 1128 to M2M Server 1110, for example via the GM2M interface. Example information elements for PDP Context Activation/Modification Request Messages are shown in Table 15, below.

TABLE 15

Information Elements for M2M Device Location Reporting Update Messages

| IEI | Information Element | Type/Reference | Presence | Format | Length |
|---|---|---|---|---|---|
| | IMSI | Mobile identity | M | LV | 6-9 |
| | PDP address | Packet data protocol address | O | TLV | 4-20 |

Additionally, a SGSN may send a M2M Device PDP Context Deactivation update to a M2M server, for example upon the completion of a successful PDP context deactivation procedure. There may be several types of M2M Device PDP Context Deactivation messages that a SGSN may send to an M2M server based on a PDP deactivation procedure. For example, when a SGSN receives a Deactivate PDP Context Request Message from a M2M device, it may also send a M2M Device Deactivate PDP Context Request type M2M Device PDP Context Deactivation Update message to the M2M Server via the GM2M interface. In another example, when an SGSN sends a Deactivate PDP Context Accept Message to a M2M device, it may also send a M2M Device Deactivate PDP Context Accept Message type M2M Device PDP Context Deactivation Update message to the M2M Server via the GM2M interface. Example information elements for M2M Device DP Context Deactivation Update messages (e.g., Deactivate PDP Context Accept/Complete type messages) are shown in Table 16, below.

TABLE 16

Information Elements for M2M Device PDP Context Deactivation Update Messages

| IEI | Information Element | Type/Reference | Presence | Format | Length |
| --- | --- | --- | --- | --- | --- |
| | IMSI | Mobile identity | M | LV | 6-9 |
| | PDP address | Packet data protocol address | O | TLV | 4-20 |
| | SM cause | SM Cause | M | V | 1 |

In another example, a network node, such as a M2M server, may initiate a PDP Context Deactivation Request. For example, a M2M server may send a M2M Device PDP Context Deactivation Request to a SGSN. Upon receiving the M2M Device PDP Context Deactivation request from the M2M server, the SGSN may start a PDP context deactivation procedure. Example information elements for M2M Device PDP Context Deactivation Update messages (e.g., Deactivate PDP Context Accept/Complete type messages) are shown in Table 17, below.

TABLE 17

Information Elements for M2M Device PDP Context Deactivation Request Messages

| IEI | Information Element | Type/Reference | Presence | Format | Length |
| --- | --- | --- | --- | --- | --- |
| | IMSI | Mobile identity | M | LV | 6-9 |
| | PDP address | Packet data protocol address | O | TLV | 4-20 |

In another example, a M2M server may initiate a PDP Context Information Request. For example, a M2M server may send a M2M Device PDP Context Information Request to a SGSN to request PDP context status of a M2M device. Upon receiving the M2 M2M Device PDP Context Information Request from the M2M server, the SGSN may treat the request a M2M PDP Context Activation Update message. Example information elements for M2M Device PDP Context Information Request messages are shown in Table 18, below.

TABLE 18

Information Elements for M2M Device PDP Context Information Request Messages

| IEI | Information Element | Type/Reference | Presence | Format | Length |
| --- | --- | --- | --- | --- | --- |
| | IMSI | Mobile identity | M | LV | 6-9 |
| | Negotiated QoS | Quality of service | M | LV | 13-17 |
| | Radio priority | Radio priority | M | V | ½ |
| | PDP address | Packet data protocol address | O | TLV | 4-20 |
| | SM cause | SM Cause | M | V | 1 |

For each of the aforementioned "request" messages originating from a M2M server and sent to a SGSN via the GM2M interface, a timeout may be employed. The timeout may be multiple of 1 second, and in an embodiment may not exceed 60 seconds. For the case in which no response is received within the timeout, the procedure may be cancelled and/or reinitiated.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

* * *

What is claimed is:

1. A network node comprising:
a transmitter;
a receiver; and
a processor, wherein:
the receiver and the processor are configured to receive a request for an authentication and key establishment procedure from a machine to machine (M2M) device;
the processor is further configured to determine a key agreement between the network node and the M2M device using the authentication and key establishment procedure;
the processor and the receiver are further configured to receive a request from an M2M server for the key agreement to be used to communicate with the M2M device; and
the processor and the transmitter are configured to send the key agreement to the M2M server.

2. The network node of claim 1, wherein the processor and the transmitter are further configured to send authentication and key establishment information to the M2M device.

3. The network node of claim 1, wherein the processor is further configured to determine that the M2M device is connected to the network node using an access point name (APN).

4. The network node of claim 1, wherein the network node is a cellular network node.

5. A method implemented by a network node, the method comprising:
- receiving a request for an authentication and key establishment procedure from a machine to machine (M2M) device;
- determining a key agreement between the network node and the M2M device using the authentication and key establishment procedure;
- receiving a request from an M2M server for the key agreement to be used to communicate with the M2M device; and
- sending the key agreement to the M2M server.

6. The method of claim 5, further comprising sending authentication and key establishment information to the M2M device.

7. The method of claim 5, further comprising determining that the M2M device is connected to the network node using an access point name (APN).

8. The method of claim 5, wherein the network node is a cellular network node.

9. The network node of claim 1, wherein the request received from the M2M server includes an M2M device identity.

10. The method of claim 5, wherein the request received from the M2M server includes an M2M device identity.

* * * * *